United States Patent
Zeng et al.

(10) Patent No.: US 12,244,544 B2
(45) Date of Patent: Mar. 4, 2025

(54) CROSS-DIVISION DUPLEX SIGNALING

(71) Applicant: APPLE INC., Cupertino, CA (US)

(72) Inventors: Wei Zeng, Cupertino, CA (US); Dawei Zhang, Cupertino, CA (US); Seyed Ali Akbar Fakoorian, Cupertino, CA (US); Yushu Zhang, Beijing (CN); Haitong Sun, Cupertino, CA (US); Hong He, Cupertino, CA (US); Chunhai Yao, Beijing (CN); Sigen Ye, Cupertino, CA (US); Chunxuan Ye, Cupertino, CA (US); Weidong Yang, Cupertino, CA (US); Oghenekome Oteri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 17/787,691

(22) PCT Filed: Sep. 3, 2021

(86) PCT No.: PCT/CN2021/116564
§ 371 (c)(1),
(2) Date: Jun. 21, 2022

(87) PCT Pub. No.: WO2023/029017
PCT Pub. Date: Mar. 9, 2023

(65) Prior Publication Data
US 2023/0344612 A1    Oct. 26, 2023

(30) Foreign Application Priority Data
Sep. 2, 2021    (WO) ............... PCT/CN2021/116250

(51) Int. Cl.
*H04L 5/14*    (2006.01)

(52) U.S. Cl.
CPC ............. *H04L 5/1438* (2013.01); *H04L 5/14* (2013.01); *H04L 5/1469* (2013.01)

(58) Field of Classification Search
CPC ............. H04W 72/0446; H04W 72/23; H04W 72/0453; H04L 5/1438; H04L 5/1469; H04L 5/14
See application file for complete search history.

(56) References Cited

U.S. PATENT DOCUMENTS 11,463,869 B2 * 10/2022  Abdelghaffar ............ H04L 5/14
2018/0287739 A1 * 10/2018  Kim ..................... H04J 11/0023
(Continued)

FOREIGN PATENT DOCUMENTS

CA    3022159    4/2019
CN    108028739    5/2018
(Continued)

OTHER PUBLICATIONS

[Unknown Author], "3rd Generation Partnership Project; Technical Specification Group Radio Access Network; NR; Physical layer procedures for control (Release 15)," 3GPP TS 38.213 V15.14.0, Jun. 2021, 110 pages.
(Continued)

*Primary Examiner* — Chi Ho A Lee
(74) *Attorney, Agent, or Firm* — Fish & Richardson P.C.

(57) ABSTRACT

Methods, systems, and apparatus, including computer programs encoded on computer storage media, for signaling cross-division duplex configurations. One of the methods includes identifying, by a first device and for a first link with a second device, a switch in a first bandwidth part to a second bandwidth part for the first link, the first link associated with a second link having a third bandwidth part; determining, by the first device, whether a bandwidth band between the second bandwidth part and the third bandwidth
(Continued)

part satisfies a threshold guard band; and selectively determining to maintain the third bandwidth part for the second link or to switch the third bandwidth part to a fourth bandwidth part for the second link using a result of the determination whether the bandwidth band between the second bandwidth part and the third bandwidth part satisfies the threshold guard band.

17 Claims, 13 Drawing Sheets

(56) References Cited

U.S. PATENT DOCUMENTS

| | | | |
|---|---|---|---|
| 2021/0258100 A1 | 8/2021 | Hussein et al. | |
| 2021/0314946 A1* | 10/2021 | Ang | H04L 5/001 |
| 2021/0321409 A1* | 10/2021 | Fakoorian | H04W 72/23 |
| 2021/0329646 A1* | 10/2021 | Fakoorian | H04W 72/53 |
| 2021/0336759 A1* | 10/2021 | Abdelghaffar | H04L 5/0044 |
| 2021/0392674 A1* | 12/2021 | Abotabl | H04W 52/288 |
| 2022/0376964 A1* | 11/2022 | Geng | H04L 5/0094 |
| 2023/0064334 A1* | 3/2023 | Abotabl | H04W 72/044 |
| 2023/0144233 A1* | 5/2023 | Manolakos | H04B 7/0481 375/262 |
| 2023/0163939 A1 | 5/2023 | Zeng et al. | |

FOREIGN PATENT DOCUMENTS

| | | |
|---|---|---|
| CN | 110073631 | 7/2019 |
| WO | WO 2021086116 | 5/2021 |
| WO | WO 2021146887 | 7/2021 |

OTHER PUBLICATIONS

[Unknown Author], "3rd Generation Partnership Project; Technical Specification Group Radio Access Network; NR; Medium Access Control (MAC) protocol specification (Release 16)," 3GPP TS 38.321 V16.5.0, Jun. 2021, 157 pages.

[Unknown Author], "3rd Generation Partnership Project; Technical Specification Group Radio Access Network; NR; Physical channels and modulation (Release 15)," 3GPP TS 38.211 V15.8.0, Dec. 2019, 97 pages.

[Unknown Author], "3rd Generation Partnership Project; Technical Specification Group Radio Access Network; NR; Physical layer procedures for control (Release 15)," 3GPP TS 38.213 V15.8.0, Dec. 2019, 109 pages.

[Unknown Author], "3rd Generation Partnership Project; Technical Specification Group Radio Access Network; NR; Radio Resource Control (RRC) protocol specification (Release 15)," 3GPP TS 38.331 V15.14.0, Jun. 2021, 540 pages.

[Unknown Author], "3rd Generation Partnership Project; Technical Specification Group Radio Access Network; NR; Requirements for support of radio resource management (Release 15)," 3GPP TS 38.133 V15.8.0, Dec. 2019,.

Intel Corporation, "NR Spectrum Utilization, "3GPP TSG-RAN WG4 Meeting #85, R4-1713688, Reno, USA, Nov. 27-Dec. 1, 2017, 12 pages.

PCT International Search Report and Written Opinion in Appln. No. PCT/CN2021/116250, dated May 26, 2022, 9 pages.

PCT International Search Report and Written Opinion in Appln. No. PCT/CN2021/116564, dated May 25, 2022, 10 pages.

* cited by examiner

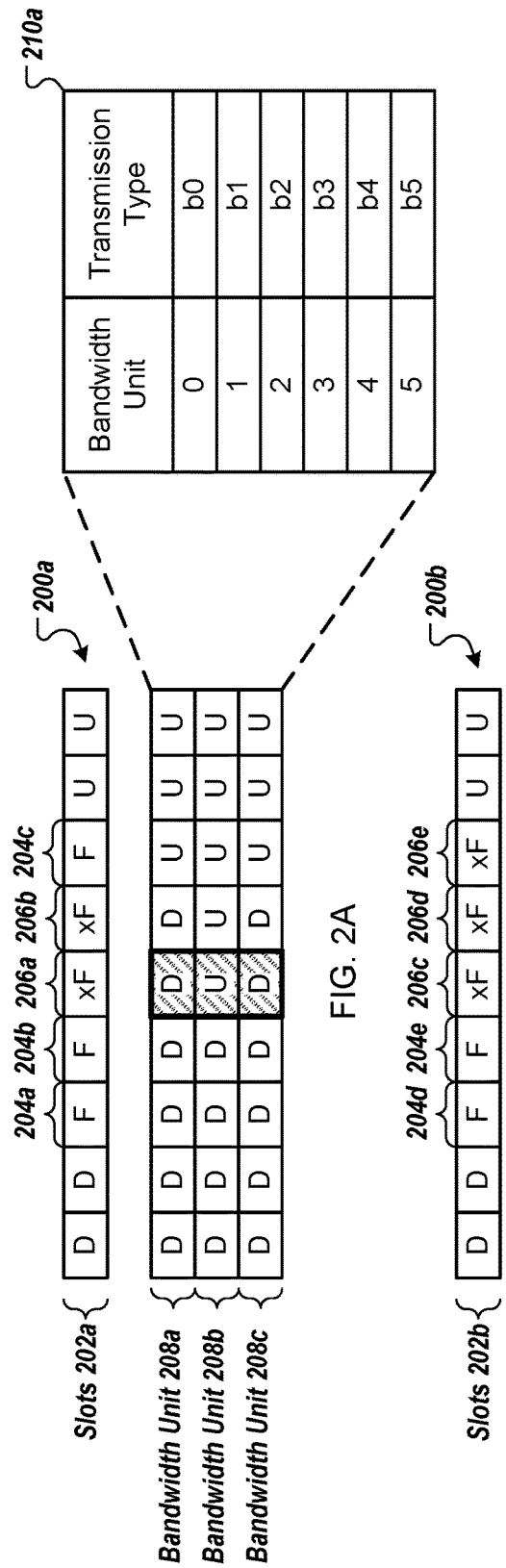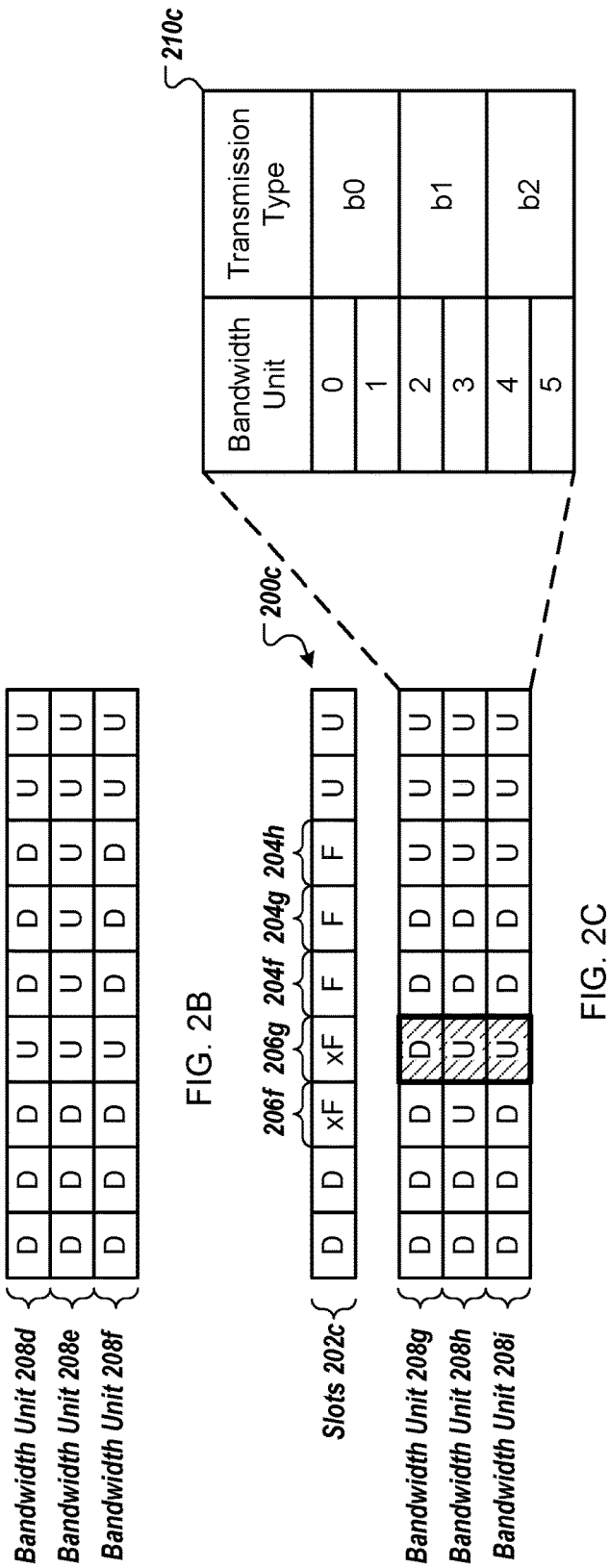

700

Determine, by a first device and for a symbol in a time slot of a cross-division duplex transmission link between the first device and a second device, that the first device can use a combination of multiple different symbol types across frequency to communicate with the second device at the symbol  702

Communicate, by the first device and with the second device using the cross-division duplex transmission link, across the symbol in the time slot using a first symbol type for a first set of bandwidth units and a second, different symbol type for a second, different set of bandwidth units  704

Determine, by a first device and for a symbol in a time slot of a cross-division duplex transmission link between the first device and a second device, that the first device can use a combination of multiple different symbol types across frequency to communicate with the second device at the symbol using a downlink control information  802

Communicate, by the first device and with the second device using the cross-division duplex transmission link, across the symbol in the time slot using a first symbol type for a first bandwidth unit from the multiple different bandwidth units and a second, different symbol type for a second, different bandwidth unit from the multiple different bandwidth units  804

Identify, by a first device and for a first link with a second device, a switch in a first bandwidth part to a second bandwidth part for the first link 902

Determine, by the first device, whether a bandwidth band between the second bandwidth part and the third bandwidth part satisfies a threshold guard band 904

Selectively determine to maintain the third bandwidth part for the second link or to switch the third bandwidth part to a fourth bandwidth part for the second link using a result of the determination whether the bandwidth band between the second bandwidth part and the third bandwidth part satisfies the threshold guard band 906

Determine, by a device and using configuration data that specifies a bandwidth part switch for a first link, to a switch from a first bandwidth part to a second bandwidth part for the first link 1002

Determine whether the third bandwidth part for the second link is associated with the second bandwidth part for the first link 1004

Selectively determine to maintain the third bandwidth part for the second link or to switch the third bandwidth part to a fourth bandwidth part for the second link using a result of the determination whether the third bandwidth part for the second link is associated with the second bandwidth part for the first link 1006

FIG. 10

CROSS-DIVISION DUPLEX SIGNALING

CLAIM OF PRIORITY

This application claims priority under 35 U.S.C. 371 to International Application No. PCT/CN2021/116564, filed on Sep. 3, 2021 which claims priority under 35 U.S.C. 371 to International Application No. PCT/CN2021/116250, filed on Sep. 2, 2021, the entire contents of each are hereby incorporated by reference.

TECHNICAL FIELD

This specification relates to systems and techniques for using cross-division duplexing.

BACKGROUND

Electronic devices can communicate with one another through one or more cellular networks. For example, a device can communicate with another device across a cellular network using a half-duplex link, e.g., time-division duplexing ("TDD"), a full-duplex link, e.g., frequency-division duplexing ("FDD"), or a cross-division duplex link ("xDD"). The communication can include voice data, message data, or other appropriate types of data.

SUMMARY

In general, one aspect of the subject matter described in this specification can be embodied in methods that include the actions of identifying, by a first device and for a first link with a second device, a switch in a first bandwidth part to a second bandwidth part for the first link, the first link associated with a second link having a third bandwidth part; determining, by the first device, whether a bandwidth band between the second bandwidth part and the third bandwidth part satisfies a threshold guard band; and selectively determining to maintain the third bandwidth part for the second link or to switch the third bandwidth part to a fourth bandwidth part for the second link using a result of the determination whether the bandwidth band between the second bandwidth part and the third bandwidth part satisfies the threshold guard band. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include determining, by the first device, that the bandwidth band between the second bandwidth part and the third bandwidth part satisfies the threshold guard band. Selectively determining can include selectively determining to maintain the third bandwidth part for the second link in response to determining that the bandwidth band between the second bandwidth part and the third bandwidth part satisfies the threshold guard band. Determining that the bandwidth band between the second bandwidth part and the third bandwidth part satisfies the threshold guard band can include determining that the bandwidth band between the second bandwidth part and the third bandwidth part is greater than, equal to, or greater than or equal to the threshold guard band.

In some implementations, the method can include determining, by the first device, that the bandwidth band between the second bandwidth part and the third bandwidth part does not satisfy the threshold guard band. Selectively determining can include selectively determining to switch the third bandwidth part to the fourth bandwidth part for the second link in response to determining that the bandwidth band between the second bandwidth part and the third bandwidth part does not satisfy the threshold guard band. Determining that the bandwidth band between the second bandwidth part and the third bandwidth part does not satisfy the threshold guard band can include determining that the bandwidth band between the second bandwidth part and the third bandwidth part is less than, equal to, or less than or equal to the threshold guard band.

In some implementations, identifying the switch can include identifying the switch from a first division duplex type to a second division duplex type. Identifying the switch from the first division duplex type to the second division duplex type can include identifying the switch from time-division duplex to frequency-division duplex. Identifying the switch from the first division duplex type to the second division duplex type can include identifying the switch from frequency-division duplex to time-division duplex.

In some implementations, the first device can be a next generation node B. The second device can be a user equipment. The first link can be a downlink. The second link can be an uplink. The first link can be an uplink. The second link can be a downlink.

In general, one aspect of the subject matter described in this specification can be embodied in methods that include the actions of determining, by a device and using configuration data that specifies a bandwidth part switch for a first link, to a switch from a first bandwidth part to a second bandwidth part for the first link, the first bandwidth part for the first link associated with a third bandwidth part for a second link; determining whether the third bandwidth part for the second link is associated with the second bandwidth part for the first link; and selectively determining to maintain the third bandwidth part for the second link or to switch the third bandwidth part to a fourth bandwidth part for the second link using a result of the determination whether the third bandwidth part for the second link is associated with the second bandwidth part for the first link. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include determining that the third bandwidth part for the second link is associated with the second bandwidth part for the first link. Selectively determining can include determining to maintain the third bandwidth part for the second link in response to determining that the third bandwidth part for the second link is associated with the second bandwidth part for the first link.

In some implementations, the method can include determining that the third bandwidth part for the second link is not associated with the second bandwidth part for the first link. Selectively determining can include determining to switch the third bandwidth part to the fourth bandwidth part for the second link in response to determining that the third bandwidth part for the second link is not associated with the second bandwidth part for the first link.

In some implementations, determining whether the third bandwidth part for the second link is associated with the second bandwidth part for the first link can include determining that the configuration data indicates that the device should switch the third bandwidth part to the fourth bandwidth part and switch the first bandwidth part to the second bandwidth part.

In some implementations, the configuration data can include downlink control information. The method can include receiving, by the device and from a second device, the downlink control information. The device can be a user equipment. The second device can be a next generation node B.

In some implementations, identifying the switch can include identifying the switch from a first division duplex type to a second division duplex type. Identifying the switch from the first division duplex type to the second division duplex type can include identifying the switch from time-division duplex to frequency-division duplex. Identifying the switch from the first division duplex type to the second division duplex type can include identifying the switch from frequency-division duplex to time-division duplex.

In some implementations, the first link can be a downlink. The second link can be an uplink. The first link can be an uplink. The second link can be a downlink. The first bandwidth part and the third bandwidth part can be unpaired spectrum.

In general, one aspect of the subject matter described in this specification can be embodied in methods that include the actions of determining, by a device, to switch from a first slot to a second slot including switching i) a first link from a first bandwidth part for the first slot to a second bandwidth part for the second slot and ii) a second link from a third bandwidth part for the first slot to a fourth bandwidth part for the second slot; determining, for each of at least four bandwidth parts, a corresponding subcarrier spacing, the at least four bandwidth parts including the first bandwidth part, the second bandwidth part, the third bandwidth part, and the fourth bandwidth part; determining, from the at least four subcarrier spacings, a smallest subcarrier spacing; selecting a switch delay period that indicates a time after the first slot for the device to wait before communicating using the smallest subcarrier spacing; after the end of the first slot, waiting for the switch delay period; and after waiting for the switch delay period, communicating using the second slot. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Selecting the switch delay period can include selecting the switch delay period that comprises one of: fewer than two slots for a new radio slot length of 0.5 milliseconds, fewer than three slots for a new radio slot length of 0.25 milliseconds, or fewer than six slots for a new radio slot length of 0.125 milliseconds. Selecting the switch delay period can include selecting the switch delay period that comprises one of: more than one slot for a new radio slot length of 1 millisecond, more than two slots for a new radio slot length of 0.5 milliseconds, more than three slots for a new radio slot length of 0.25 milliseconds, or more than six slots for a new radio slot length of 0.125 milliseconds.

In some implementations, the device can be a user equipment. Communicating using the second slot can include communicating, by the user equipment and with a next generation node B, using the second slot.

In some implementations, determining to switch from the first slot to the second slot can include determining to switch from the first slot for a first division duplex type to the second slot for a second division duplex type. Determining to switch from the first slot for the first division duplex type to the second slot for the second division duplex type can include determining to switch from a time-division duplex slot to a frequency-division duplex slot. Determining to switch from the first slot for the first division duplex type to the second slot for the second division duplex type can include determining to switch from a frequency-division duplex slot to a time-division duplex slot.

In some implementations, the first link can be a downlink. The second link can be an uplink. The first link can be an uplink. The second link can be a downlink. The first bandwidth part and the third bandwidth part can be unpaired spectrum.

In general, one aspect of the subject matter described in this specification can be embodied in methods that include the actions of determining, by a first device and for a symbol in a time slot of a cross-division duplex transmission link between the first device and a second device, that the first device can use a combination of multiple different symbol types across frequency to communicate with the second device at the symbol using cell-specific configuration data that indicates, for each of multiple symbols across time including the symbol, various combinations of two or more symbol types from the multiple different symbol types to use to communicate across the respective symbol; and communicating, by the first device and with the second device using the cross-division duplex transmission link, across the symbol in the time slot using a first symbol type for a first set of bandwidth units and a second, different symbol type for a second, different set of bandwidth units. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method can include sending, to the second device, data that indicates, for the symbol, a first channel bandwidth as the first set of bandwidth units for the first symbol type and a second channel bandwidth for the second, different set of bandwidth units for the second, different symbol type.

In some implementations, the method can include sending, to the second device, data that indicates, for the symbol, the first symbol type for a first bandwidth unit from the first set of bandwidth units and the second, different symbol type for a second bandwidth unit from the second, different set of bandwidth units. The first bandwidth unit can include a first physical resource block and the second bandwidth unit can include a second physical resource block. Sending the data can include sending a bitmap that includes, for each bandwidth unit, a bit that indicates whether the corresponding bandwidth unit has a downlink symbol or an uplink symbol. Sending the data can include sending a bitmap that includes, for one or more groups of multiple bandwidth units, a bit that indicates whether the bandwidth units in the corresponding group have a downlink symbol or an uplink symbol.

In some implementations, the method can include sending, to the second device, data that indicates, for the symbol, a first quantity of downlink symbols at a first extreme of a bandwidth unit range for the symbol and a second quantity of uplink symbols adjacent to the first quantity of downlink symbols in the bandwidth unit range for the symbol. The first extreme of the bandwidth unit range can be the highest frequencies in the bandwidth unit range. The first extreme of the bandwidth unit range can be the lowest frequencies in the bandwidth unit range.

In some implementations, the method can include sending, to the second device, data that indicates, i) for the first set of bandwidth units of the symbol: a first start location, a first size, and the first symbol type, and ii) for the second, different set of bandwidth units of the symbol: a second start location, a second size, and the second, different symbol type. The method can include sending, to the second device, data that indicates, i) for the first set of bandwidth units of the symbol: a first start location, a first end location, and the first symbol type, and ii) for the second, different set of bandwidth units of the symbol: a second start location, a second end location, and the second, different symbol type.

In some implementations, the cell-specific configuration data can be a tdd-UL-DL-ConfigurationCommon that identifies one or more symbols for which a device can communicate using the multiple different symbol types across frequency and using the multiple different symbol types across time. Determining that the first device can use a combination of multiple different symbol types across frequency to communicate with the second device at the symbol can include determining, by the first device, that the cell-specific configuration data identifies the symbol as a flexible symbol that the first device can use to communicate using a first symbol type from the multiple different symbol types or a second, different symbol type from the multiple different symbol types but not both; and in response to determining that the cell-specific configuration data identifies the symbol as a flexible symbol, determining, by the first device, that the first device can use a combination of multiple different symbol types across frequency to communicate with the second device at the symbol based on the cross-division duplex transmission link between the first device and the second device.

In some implementations, determining that the first device can use a combination of multiple different symbol types across frequency to communicate with the second device at the symbol can include determining, by the first device, that the cell-specific configuration data identifies the symbol as a cross-division flexible symbol that the first device can use to communicate using a combination of a first symbol type from the multiple different symbol types and a second, different symbol type from the multiple different symbol types. Determining that the first device can use a combination of multiple different symbol types across frequency to communicate with the second device at the symbol can include determining that the cell-specific configuration data identifies the symbol as a cross-division flexible symbol and a second symbol as a flexible symbol that the first device can use to communicate using a first symbol type from the multiple different symbol types or a second, different symbol type from the multiple different symbol types but not both. The cell-specific configuration data can include, in order, one or more downlink symbols, one or more flexible symbols, one or more cross-division flexible symbols, one or more second flexible symbols, and one or more uplink symbols. The cell-specific configuration data can include, in order, one or more downlink symbols, one or more flexible symbols, one or more cross-division flexible symbols, and one or more uplink symbols. The cell-specific configuration data can include, in order, one or more downlink symbols, one or more cross-division flexible symbols, one or more flexible symbols, and one or more uplink symbols.

In some implementations, determining that the first device can use a combination of multiple different symbol types across frequency to communicate with the second device at the symbol can include determining, by the first device, that the first device can use a combination of multiple different symbol types across frequency to communicate with the second device at the symbol using two or more cell-specific configuration data sets that i) each are for a different sets of bandwidth units, and ii) include the cell-specific configuration data. The two or more cell-specific configuration data sets can identify a quantity of frequency sub-bands and a size for a sub-band. A first cell-specific configuration data set can include a first quantity of frequency sub-bands and a second cell-specific configuration data set can include a second, different quantity of frequency sub-bands. A first cell-specific configuration data set can include a particular quantity of frequency sub-bands and a second cell-specific configuration data set can include the particular quantity of frequency sub-bands. A first cell-specific configuration data set can include a first sub-band size and a second cell-specific configuration data set can include a second, different sub-band size. A first cell-specific configuration data set can include a particular sub-band size and a second cell-specific configuration data set can include the particular sub-band size.

In some implementations, the cell-specific configuration data can include i) a tdd-UL-DL-ConfigurationCommon that identifies one or more symbols for which a device can communicate using the multiple different symbol types across time and ii) a cross-division flexible symbol cell-specific configuration data that identifies one or more cross-division flexible symbols for which a device can communicate using the multiple different symbol types across frequency and using the multiple different symbol types across time. The tdd-UL-DL-ConfigurationCommon can include a flag that indicates that the cell-specific configuration data includes the cross-division flexible symbol cell-specific configuration data. The method can include detecting, by the first device, the existence of the cross-division flexible symbol cell-specific configuration data using the flag; and in response to detecting the existence of the cross-division flexible symbol cell-specific configuration data using the flag, determining the one or more cross-division flexible symbols that include the symbol.

In some implementations, a combination of the cell-specific configuration data and the cross-division flexible symbol cell-specific configuration data can include, in order, one or more downlink symbols, one or more flexible symbols, one or more cross-division flexible symbols, one or more second flexible symbols, and one or more uplink symbols. A combination of the cell-specific configuration data and the cross-division flexible symbol cell-specific configuration data can include, in order, one or more downlink symbols, one or more flexible symbols, one or more cross-division flexible symbols, and one or more uplink symbols. A combination of the cell-specific configuration data and the cross-division flexible symbol cell-specific configuration data can include, in order, one or more downlink symbols, one or more cross-division flexible symbols, one or more flexible symbols, and one or more uplink symbols.

In some implementations, determining that the first device can use a combination of multiple different symbol types across frequency to communicate with the second device at the symbol can include determining, by the first device, the cell-specific configuration data that indicates, for a time slot that includes multiple symbols including the symbol, that the first device can use a combination of different symbol types across frequency for each symbol in the multiple symbols. The cell-specific configuration data can include one or more of: a cross-division slot field that indicates a quantity of consecutive cross-division flexible slots in a pattern for which a device can communicate using the multiple different symbol types across frequency and using the multiple different symbol types across time; a cross-division symbol field that indicates a quantity of consecutive cross-division flexible symbols in a cross-division flexible slot; a flexible slots field that indicates a quantity of consecutive flexible slots in a pattern for which a device can communicate using the multiple different symbol types across time; a flexible symbol field that indicates a quantity of consecutive flexible symbols in a flexible slot; or a flexible symbol frequency field that indicates a quantity of downlink, a quantity of uplink, or both, symbols across frequency.

In some implementations, the cross-division slot field can indicate the quantity of consecutive cross-division flexible symbols in the beginning of the cross-division slot field following a last full cross-division flexible slot. The cross-division slot field can indicate the quantity of consecutive cross-division flexible symbols in the end of the cross-division slot field preceding a first full cross-division flexible slot. The flexible symbol field can indicate the quantity of consecutive flexible symbols in the beginning of the flexible slot following a last full flexible slot. The flexible symbol field can indicate the quantity of consecutive flexible symbols in the end of the flexible slot preceding a first full flexible slot.

In some implementations, the method can include receiving, by the first device and from the second device, the cell-specific configuration data. The first device can be a user equipment. The second device can be a next generation node B.

In general, one aspect of the subject matter described in this specification can be embodied in methods that include the actions of determining, by a first device and for a symbol in a time slot of a cross-division duplex transmission link between the first device and a second device, that the first device can use a combination of multiple different symbol types across frequency to communicate with the second device at the symbol using a downlink control information that includes, for each of multiple symbols across time including the symbol, a slot format combination that indicates one or more symbol types from the multiple different symbol types to use to communicate across the respective symbol using a bandwidth unit from multiple different bandwidth units. Two or more slot format combinations can each for i) a corresponding slot formation combination and ii) have a different bandwidth unit from the multiple different bandwidth units; and communicating, by the first device and with the second device using the cross-division duplex transmission link, across the symbol in the time slot using a first symbol type for a first bandwidth unit from the multiple different bandwidth units and a second, different symbol type for a second, different bandwidth unit from the multiple different bandwidth units. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Each of the multiple different bandwidth units from the multiple different bandwidth units can be a frequency range. The downlink control information can include, for the first bandwidth unit from the multiple different bandwidth units, two or more slot format combinations each of which indicate a different combination of symbols from the multiple different symbol types. The method can include selecting, by the first device and using data that identifies data for transmission with the second device, a first slot format combination a) from the two or more slot format combinations b) that includes the first symbol type c) for communication during the time slot, and communicating across the symbol in the time slot using the first symbol type for the first bandwidth unit is responsive to selecting the first slot format combination.

In some implementations, the method can include receiving the downlink control information after receiving cell-specific configuration data and device-specific configuration data. The cell-specific configuration data can include tdd-UL-DL-ConfigurationCommon data. The device-specific configuration data can include tdd-UL-DL-Configuration-Dedicated data. A first slot format for the first bandwidth unit can have a first size; and a second slot format for the second bandwidth unit can have a second, different size.

The subject matter described in this specification can be implemented in various embodiments and may result in one or more of the following advantages. In some implementations, use of cross-division duplexing can improve data transmission latency, a base station coverage area, bandwidth capacity, e.g., for uplink transmissions, or a combination of two or more of these, compared to systems that use only time-division duplexing, reduce complexity compared to systems that use only frequency-division duplexing, or both. In some implementations, a base station can use cross-division duplexing while the user equipment connected to the base station does not. This can reduce the complexity, e.g., configuration complexity and hardware resource complexity, of the user equipment, while providing benefits to the base station. In some examples, user equipment that is not cross-division duplexing enabled does not need new signaling for cross-division duplexing even though a base station with which the user equipment communicates is cross-division duplexing enabled.

In some implementations, use of the configuration data can enable the base station to dynamically determine that various user equipment require more bandwidth for a particular link type and to switch to that link type for the various user equipment while maintaining a different link type for other user equipment. For instance, this can provide the various user equipment with more uplink transmission bandwidth for a particular time slot, identified by the downlink control information sent to the various user equipment, while the other user equipment communicates with the based station using downlink connections for the particular time slot. In some implementations, the systems and methods described in this specification can use a threshold guard band. Parameters for the threshold guard band can be selected to reduce a likelihood of interference between the bandwidth parts adjacent to the threshold guard band, such as self-interference between uplink and downlink transmissions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-C depict examples of cross-division duplexing signaling data.

FIGS. 7-8 are flow diagrams of example processes for communication between devices using cross-division duplexing configuration data.

FIG. 9 is a flow diagram of an example process for using a threshold guard band.

FIG. 10 is a flow diagram of a process for switching bandwidth parts.

Like reference numbers and designations in the various drawings indicate like elements.

DETAILED DESCRIPTION

Figure 1:
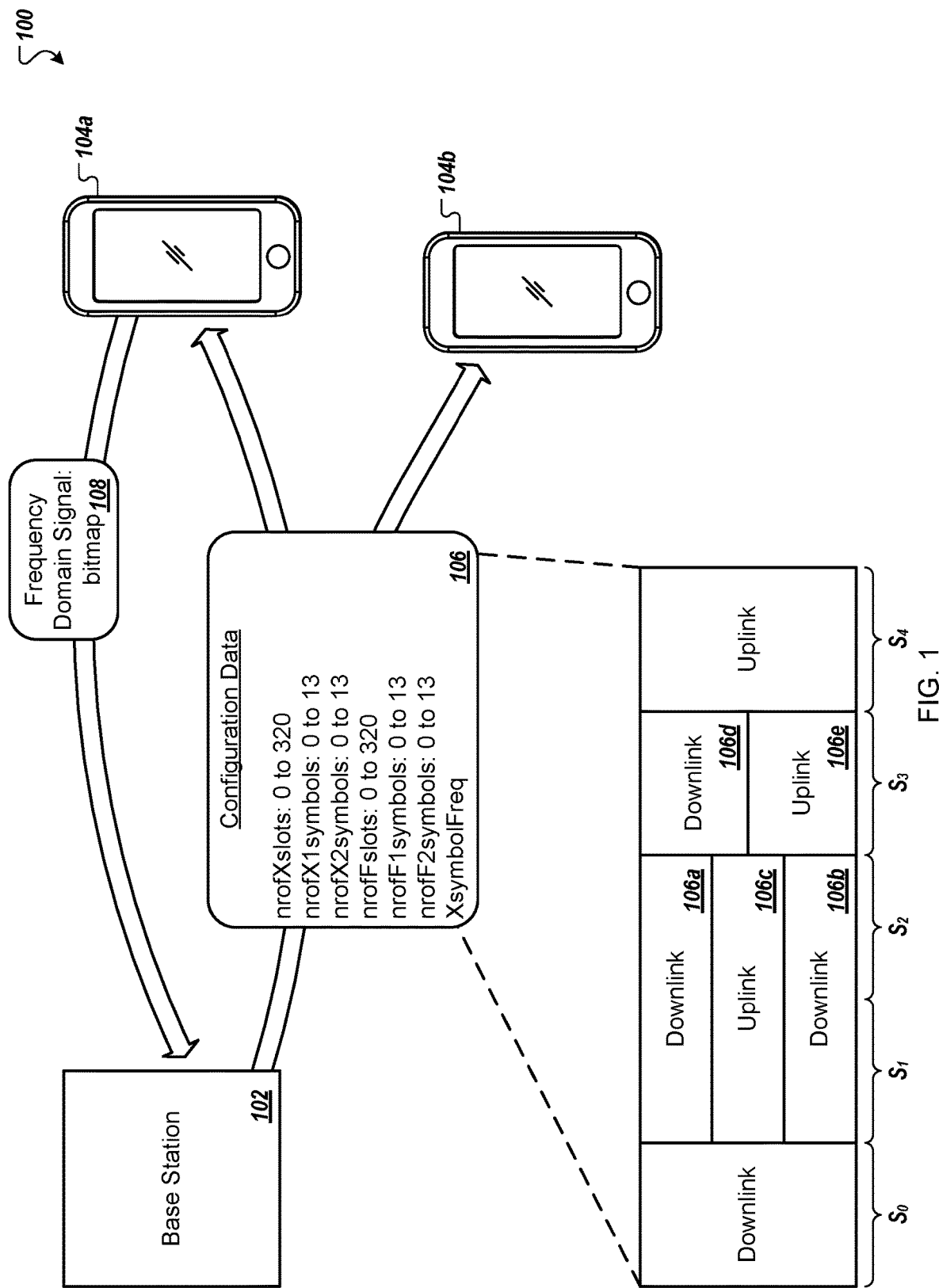
FIG. 1 depicts an example of an environment in which a base station communicates with multiple user equipment devices using cross-division duplexing ("xDD").

In the 5th generation mobile communication system ("5GS") specified by the 3rd Generation Partnership Project ("3GPP"), e.g., in release 18, slots across time can be used for time-division duplexing ("TDD") or frequency-division duplexing ("FDD"). This use of time slots for FDD within TDD is referred to as cross-division duplexing ("xDD"), flexible duplex, or sub-band full duplex. In xDD, part of the frequency band for a time slot, e.g., a symbol within a time slot, is allocated to uplink transmission while another part of the frequency band is allocated to downlink transmission. Further, different frequency bands can be used for different transmission types, either uplink or downlink, in different time slots. Use of xDD can improve data transmission latency, a base station coverage area, bandwidth capacity, e.g., for uplink transmissions, or a combination of two or more of these, compared to systems that use only TDD. Further, xDD can provide one or more of these benefits without requiring full-spectrum, full-duplex at a base station, e.g., a next generation node B ("gNB"), user equipment, or both.

To enable xDD, the base station, the user equipment ("UE"), or both, need a framework, corresponding signaling, or both, for xDD configurations. This can occur for either half-duplex UE, full-duplex UE, or both. For instance, the base station can require a framework and signaling to indicate the xDD configuration to the UE. The configuration can be a cell-specific configuration, UE-specific configuration, or dynamic configuration.

As a framework, a system, e.g., a base station, can use bandwidth parts ("BWPs"), sub-band frequencies, or both, to communicate using xDD. The system can use associations between bandwidth parts to indicate that when there is a switch for a first bandwidth part for a first link, e.g., a downlink or an uplink, there should be a corresponding switch for a second bandwidth part for a second link, e.g., of the opposite type, such as an uplink when the first is a downlink or a downlink when the first is an uplink. This can occur when a base station switches from a first bandwidth part for the first link, which has a first frequency range or set of bandwidth units, to a third bandwidth part for the first link, which has a third, different frequency range or set of bandwidth units. Although the examples described in this specification generally refer to bandwidth units, a bandwidth unit can be a frequency range, a physical resource block, or another appropriate type of bandwidth unit.

The system, e.g., the base station, can determine whether to switch the second bandwidth part for the second link to a fourth bandwidth part. The system can make this determination based on a frequency band between the third bandwidth part and the second bandwidth part, e.g., and whether the frequency band satisfies a threshold guard band.

The system can make this determination using identifiers for the bandwidth parts. For instance, the system can include data, such as a mapping, that indicates which bandwidth parts are associated. When the system switches from the first to the third bandwidth part when the third bandwidth part is not associated with the second, e.g., using respective identifiers for the parts, the system switches from the second bandwidth part to the fourth. When the system switches from the first to the third bandwidth part when the third bandwidth part is associated with the second, the system determines to skip switching from the second bandwidth part to the fourth.

In some examples, a base station can use cross-division duplexing while the user equipment connected to the base station does not. This can reduce the complexity, e.g., configuration complexity and hardware resource complexity, of the user equipment, while providing benefits to the base station. When the base station determines to use a particular type of link, e.g., uplink or downlink, with a user equipment, the base station can indicate this type of link using configuration data. The configuration data can be a downlink control information, a radio resource control, or can include both, that the base station sends to the user equipment. Use of the configuration data can enable the base station to dynamically determine that various user equipment require more bandwidth for a particular link type and to switch to that link type for the various user equipment while maintaining a different link type for other user equipment. For instance, this can provide the various user equipment with more uplink transmission bandwidth for a particular time slot, identified by the downlink control information sent to the various user equipment, while the other user equipment communicates with the based station using downlink connections for the particular time slot.

The system, e.g., a user equipment, can determine a switch delay when switching from a first time slot with a first configuration to a second time slot with a second configuration. The system can make this determination using a subcarrier spacing ("SCS") for the bandwidth parts for the first and second time slots. For instance, the system can determine the smallest subcarrier spacing and select the switch delay using the smallest subcarrier spacing.

In some examples, instead of or in addition to use of bandwidth parts, a system can use sub-band based cross-division duplexing. For the signaling, the base station can generate configuration data for the user equipment which configuration data can indicate time slots, symbols, or both, that the user equipment can use for cross-division duplexing. The configuration data can include a tdd-UL-DL-ConfigurationCommon, a tdd-UL-DL-Configuration-Dedicated, xDD specific configuration data, or a combination of two or more of these. xDD specific configuration data can include, for example, tdd-UL-DL-ConfigurationCommonXDD, or tdd-UL-DL-Configuration-DedicatedXDD. In some examples, the configuration data can include downlink control information. The downlink control information can include slot format frequency combinations, which can include slot format indicators that identify valid combinations of link types for various frequencies. A link type can be a direction of a link, such as uplink or downlink.

The base station can provide, to the user equipment, data that indicates the particular link types used across frequency. In some examples, the user equipment can provide the data that indicates the particular link types to the base station. This data can be a bitmap that identifies, across frequency, which frequencies were used for a first link type, e.g., downlink, and which frequencies were used for a second link type, e.g., uplink. The bitmap can identify frequencies based on frequency resources, e.g., physical resource blocks, groups of frequency resources, e.g., groups of physical resource blocks, or another appropriate mapping. In some examples, the link types can be identified by frequency start location, frequency end location, frequency block size, or a combination of two or more of these.

FIG. 1 depicts an example of an environment 100 in which a base station 102 communicates with multiple user equipment devices 104a-b using cross-division duplexing ("xDD"). The base station 102 can be a cellular base station that communicates with the multiple user equipment devices 104a-b as the user equipment moves within a range of the base station 102.

The base station 102 can use bandwidth parts or sub-band frequencies to communicate with the user equipment 104a-b using xDD, as discussed in more detail below. For instance, the base station 102 can use, within a time slot, a first bandwidth part or a first sub-band frequency to provide a downlink to the user equipment 104a and a second, different bandwidth part or a second, different sub-band frequency to provide an uplink to the user equipment 104a.

To enable the user equipment 104a to communicate using xDD, the base station 102 can provide the user equipment 104a with configuration data 106. The configuration data 106 can indicate configuration parameters for flexible time slots, cross-division flexible time slots, e.g., xFlexible time slots, uplink time slots, downlink time slots, or a combination of two or more of these, e.g., including xFlexible time slots. A flexible time slot can be a time slot used for either an uplink symbol, or a downlink symbol but not both. A cross-division flexible time slot can indicate that the base station 102, the user equipment 104a, or both, can use different bandwidth units within the time slot for uplink symbols and downlink symbols and enable the corresponding device to communicate using both an uplink and a downlink substantially concurrently within a time slot.

For instance, the configuration data 106 can identify values for multiple slots, e.g., up to 321 slots. In FIG. 1, for the sake of brevity, the example shown includes five slots, $S_0$, $S_1$, $S_2$, $S_3$, and $S_4$. The configuration data 106 indicates for the first slot $S_0$, that the first slot is for downlink transmissions. The configuration data 106 indicates that three slots can be used as cross-division flexible time slots $S_1$, $S_2$, and $S_3$. The configuration data 106 indicates that the last slot, $S_4$, is for uplink transmissions.

Although the example in FIG. 1 shows particular uplink and downlink combinations for the cross-division flexible time slots $S_1$, $S_2$, and $S_3$, the configuration data 106 does not specify the particular combination that the base station 102 or the user equipment 104a-b should use. Instead, the configuration data 106 indicates that these slots $S_1$, $S_2$, and $S_3$ can be used for any appropriate combination of uplink transmissions and downlink transmissions and the particular format for these slots can be determined in real time as a device needs to send, receive, or both, data. The device can make this determination based on the transmission requirements of the device, e.g., depending on a quantity of data the device needs to receive, send, or both.

For instance, the user equipment 104a can determine to use a first and a second sub-band frequencies 106a-b for downlink transmissions during the second and third slots $S_1$ and $S_2$ while using a third sub-band frequency 106c, e.g., between the first and the second sub-band frequencies 106a-b, for uplink transmissions. In some examples, the user equipment 104a can determine to use a fourth sub-band frequency 106d for downlink transmissions and a fifth sub-band frequency 106e for uplink transmissions.

When using sub-band frequencies for cross-division duplexing, a device can use different symbols across frequency to determine the corresponding transmission type for that frequency. For instance, from a base station, e.g., a gNB, reference, at a specific symbol in time, there can be different symbols across frequency that are a mix of downlink and uplink. From a user equipment reference, at a specific symbol in time, there can be different symbols across frequency that are a mix of downlink and uplink.

In some implementations, a device might need to be configured for cross-division duplexing to work. For example, when an environment uses sub-band frequencies for cross-division duplexing, both a base station and the user equipment that connect to the base station might need to be configured for cross-division duplexing. In such environments, when user equipment is not configured for cross-division duplexing, the base station cannot use cross-division duplexing for communications with such user equipment.

For sub-band frequencies, the base station can configure a bandwidth part to more than one symbol across frequency. For instance, the base station can configure channel bandwidth for a bandwidth part as uplink, downlink, flexible, or xFlexible. The bandwidth part that includes the channel bandwidth can then inherent its configuration from the channel bandwidths included in the bandwidth part.

The base station can indicate a slot configuration for a bandwidth part using any appropriate process. For instance, the base station can use configuration data, e.g., modification of tdd-UL-DL-ConfigurationCommon, tdd-UL-DL-Configuration-Dedicated, or downlink control information. The base station can use the configuration data as signaling to indicate to a user equipment the slot configuration by which the user equipment can communication with the base station. The base station can send the same configuration data to all user equipment in the cell, e.g., using tdd-UL-DL-ConfigurationCommon or similar configuration data. The base station can send different configuration data to some of the user equipment in the cell, e.g., using tdd-UL-DL-Configuration-Dedicated, or downlink control information.

In some examples, user equipment can use existing slot types for cross-division duplexing. For instance, user equipment can receive configuration data, e.g., a tdd-UL-DL-ConfigurationCommon, that indicate slots that are downlink slots, uplink slots, and flexible slots. The indication of which slots are flexible slots can be implicit. For instance, the configuration data can indicate that a first quantity of slots, e.g., from multiple slots, are downlink slots and a second quantity of slots, e.g., from the multiple slots, are uplink slots. The user equipment can then determine that any remaining slots, e.g., from the multiple slots, are flexible slots.

Table 1, below, depicts an example of configuration data that includes an implicit indication of flexible slots. For instance, Table 1 indicates a number of downlink slots, "nrofDownlinkSlots", and a number of uplink slots "nrofUplinkSlots". Further, Table 1 indicates a number of downlink symbols "nrofDownlinkSymbols", and a number of uplink symbols "nrofUplinkSymbols". Any remaining slots in a pattern are implicitly flexible slots. One example of configuration data is a tdd-UL-DL-ConfigurationCommon. The configuration data can be data received by all user equipment in a base station's cell.

TABLE 1

Time-Division Duplexing Configuration Parameters nrofDownlinkSlots: 0 to 320, number of consecutive full DL slots at the beginning of each DL-UL pattern
nrofDownlinkSymbols: 0 to 13, number of consecutive DL symbols in the beginning of the slot following the last full DL slot
nrofUplinkSlots: 0 to 320, Number of consecutive full UL slots at end TABLE 1-continued Time-Division Duplexing Configuration Parameters of each DL-UL pattern
nrofUplinkSymbols: 0 to 13, number of consecutive UL symbols in the end of the slot preceding the first full UL slot
dl-UL-TransmissionPeriodicity-v1530 = 3, 4 ms Although flexible slots are normally used to indicate slots that are for either uplink or downlink transmissions, but not both, in these implementations, a cross-division duplexing enabled user equipment can use the flexible slots for combined downlink and uplink transmissions across frequency. The user equipment can determine to use a flexible slot for combined downlink and uplink transmissions across frequency when other configuration data, such as a flag, indicates that the base station with which the user equipment is transmitting data is cross-division duplexing enabled. For instance, the tdd-UL-DL-ConfigurationCommon can include a new flag that indicates that the base station is cross-division duplexing enabled. Since user equipment that is not cross-division duplexing enabled are not programmed for this flag, such user equipment would ignore the flag and operate in a legacy manner, e.g., using flexible slots for either downlink or uplink transmissions but not both. Since user equipment that is cross-division duplexing enabled is programmed for the flag, such user equipment can determine that any flexible slots can be used for both uplink and downlink transmissions, across frequency, or uplink or downlink transmissions alone.

One device can indicate to another how slots are configured across time and frequency. The cross-division duplexing enabled base station can signal to the user equipment how slots are configured, across time and frequency. For instance, as described in more detail below, a cross-division duplexing enabled base station can use a bitmap that indicates the bandwidth units for a flexible slot used for downlink transmissions and other bandwidth units for the flexible slot used for uplink transmissions. The user equipment can receive the bitmap from the base station, process the bitmap, and transmit data with the base station based on the data in the bitmap. In some examples, user equipment can send slot configuration data, that indicates slot configurations across time and frequency, to a base station.

FIGS. 2A-C depict examples of cross-division duplexing signaling data. The signaling data includes configuration data 200a-c that indicates, for each of multiple different slots across time in a slot pattern 202a-c, the link types that can be used for the corresponding slot.

In FIG. 2A, the slot pattern 202a is D, D, F, F, xF, xF, F, U, and U where D represents a downlink slot, U represents an uplink slot, F represents a flexible slot that can be either a downlink slot or an uplink slot, and xF represents an xDD flexible slot that can be used for a combination of uplink, downlink, or both, transmissions. For instance, when a user equipment receives the configuration data 200a, that identifies the symbols D, D, F, F, xF, xF, F, U, and U for the slots used to communicate with the base station from which the configuration data 200a was received, the user equipment can determine to use first and second flexible slots 204a-b for downlink transmissions and a third flexible slot 204c for uplink transmissions. The user equipment can make this determination using data that indicates an amount of transmissions predicted for each of the transmission types, e.g., downlink and uplink.

The user equipment can determine one or more transmission types for each of the cross-division duplex flexible ("xFlexible") slots 206a-b. For example, the user equipment can determine to use two bandwidth units 208a, 208c for downlink transmissions and another bandwidth unit 208b for uplink transmissions for the xFlexible slots 206a-b. The user equipment can determine to use any appropriate number of bandwidth units for uplink and downlink transmissions, such as one bandwidth unit for downlink transmissions and another bandwidth unit for uplink transmissions. In some examples, the user equipment can determine to use an xFlexible slot 206a-b for a single transmission type, e.g., downlink or uplink.

The user equipment can make the determination to use bandwidth units 208a-c for a transmission type using data that indicates predicted, known, or both, transmissions for the corresponding transmission type. For instance, when the user equipment determines that, after the allocation of the flexible slots 204a-c to D, D, and U, that there are twice as much downlink transmissions predicted compared to uplink transmissions, the user equipment can select twice as many bandwidth units 208a-c for downlink transmissions compared to uplink transmissions for the xFlexible slots 206a-b. The bandwidth units for downlink transmissions can include two bandwidth units 208a, 208c that combined provide twice the bandwidth of the bandwidth unit 208b for uplink transmissions. In some examples, the downlink transmission bandwidth units can be a contiguous block of frequencies that provides twice the bandwidth of the uplink transmission bandwidth units.

The user equipment can use a bitmap 210a-b to signal, to the base station, the bandwidth units used for particular transmission types. For instance, the user equipment can determine, for a first xFlexible time slot 206a, a first set of bandwidth units 208a. The first set of bandwidth units can be the bandwidth units 0 and 1 in the bitmap 210a. The user equipment can generate the bitmap 210a that includes values b0 and b1 that identify the corresponding type for the bandwidth units 0 and 1. For instance, the bitmap can include a value of 1 for downlink symbols and 0 for uplink symbols. Here, the values b0 and b1, for the bandwidth units 0 and 1, can be 1 to indicate that the first set of bandwidth units 208a are for downlink transmissions.

Similarly, the user equipment can determine, for the first xFlexible time slot 206a, that a second set of bandwidth units 208b, that includes the bandwidth unit 2, is for uplink transmissions. The user equipment can include, in the bitmap, a corresponding uplink transmission value of 0 for the value b2. The user equipment can determine, for the first xFlexible time slot 206a, that a third set of bandwidth units 208c includes the bandwidth units 3, 4, and 5. Since these bandwidth units are for downlink transmissions, the user equipment can use a value of 1 for the transmission type b3, b4, and b5 in the bitmap 210a.

The configuration data 200a can have any appropriate pattern. For instance, in FIG. 2A, the slot pattern is: D, F, xF, F, U, which each slot type corresponding to one or more slots. Specifically, this pattern indicates that one or more slots are for downlink transmissions; then one or more flexible slots are provided for either downlink or uplink transmissions, but not both; then one or more xFlexible slots are provided for downlink, uplink, or both, transmissions; then one or more flexible slots are provided; lastly, followed by one or more uplink transmission slots.

In FIG. 2B, the slot pattern 202b is D, F, xF, U for the second configuration data 200b. In contrast to the slot pattern for the first configuration data 200a, the second slot pattern for the second configuration data includes only one set of flexible slots 204d-e before the xFlexible slots 206c-e and does not include any flexible slots after the xFlexible slots 206c-e.

As discussed in more detail above, the xFlexible slots 206c-e can be used for uplink transmissions, downlink transmissions, or a combination of both uplink and downlink transmissions. A user equipment that receives the second configuration data 200b can use a bitmap, e.g., the bitmap 210a-b, to indicate the transmission types for the xFlexible slots 206c-e. For instance, the bitmap can indicate that a first bandwidth unit 208d and a third bandwidth unit 208f for an xFlexible slot 206c are for downlink transmissions while a second bandwidth unit 208e is for uplink transmissions.

In some implementations, the configuration data, e.g., 200a-c, can include cross-division duplexing parameters. These parameters can explicitly, implicitly, or both, define cross-division duplexing parameters. For instance, the parameters can define downlink parameters, uplink parameters, and flexible parameters. This can leave the cross-division duplexing parameters implied based on the remaining slots, remaining symbols, or both, that are not explicitly defined in the configuration data 200a-c.

Table 2, below, indicates some potential configuration parameters for flexible slots. The configuration parameters can be parameters received by all user equipment in a base station's cell. In some examples, the configuration parameters can be parameters received by a subset of the user equipment in a base station's cell, e.g., as part of user equipment specific configuration parameters.

The configuration data 200a-c can include a number of flexible slots in each pattern, "nrofF1slots" or "nrofF2slots". The first number of flexible slots in a pattern "nrofF1slots" can indicate a number of slots following the downlink slots in the pattern. The second number of flexible slots in a pattern "nrofF2slots" can indicate a number of slots preceding the uplink slots in the pattern.

When a pattern indicates the first number of flexible slots "nrofF1slots" following the downlink slots, the pattern can include "nrofF1 symbols" that is a number of consecutive flexible symbols in the beginning of a slot following the last full flexible slot. The remainder of the symbols in the slot can be xFlexible symbols, including symbols across frequency.

When a pattern indicates the second number of flexible slots "nrofF2slots" following the downlink slots, the pattern can include "nrofF2symbols" that is a number of consecutive flexible symbols in the end of a slot preceding the first full flexible slot, e.g., before the uplink slots. The remainder of the symbols in the slot can be xFlexible symbols, including symbols across frequency.

The configuration data can include any appropriate combination of flexible slots, flexible symbols, or both. In some implementations, a pattern can include only the first number of flexible slots and the first number of flexible symbols, and not the second number of flexible slots or symbols. In some implementations, a pattern can include only the second number of flexible slots and the second number of flexible symbols, and not the first number of flexible slots or symbols.

TABLE 2

Flexible Slot Configuration Parameters nrofF1slots: 0 to 320: number of consecutive Flexible slots in each pattern following the downlink slots

TABLE 2-continued

Flexible Slot Configuration Parameters nrofF2slots: 0 to 320: number of consecutive Flexible slots in each pattern preceding the uplink slots
nrofF1symbols: 0 to 13: number of consecutive Flexible symbols in the beginning of the slot following the last full Flexible slot
nrofF2symbols: 0 to 13: number of consecutive Flexible symbols in the end of the slot preceding the first full Flexible slot In some examples, the configuration data 200a-c can explicitly define cross-division duplexing parameters. The configuration data 200a-c can explicitly define the cross-division duplexing ("xFlexible") parameters in any appropriate configuration data, such as part of tdd-UL-DL-ConfigurationCommon or as a new, cross-division duplexing tdd-UL-DL-ConfigurationCommonXDD.

Table 3, below, indicates some examples of xFlexible configuration parameters. The xFlexible parameters can include " " that indicates a number of consecutive xFlexible slots in a pattern. In some examples, there are two parameters, "nrofX1slots" and "nrofX2slots". The first "nrofX1slots" can indicate the number of first xFlexible slots in a pattern following a set of earlier slots, such as downlink slots, flexible slots, or either. The second "nrofX2slots" can indicate a second number of xFlexible slots in a pattern preceding a set of later slots. The later slots can be uplink slots, flexible slots, or either.

"nrofX1symbols" indicates a first number of xFlexible symbols in the beginning of a slot following the last full xFlexible slot, e.g., "nrofX1slots" slot. "nrofX2symbols" indicates a second number of xFlexible symbols in the end of a slot preceding the first full xFlexible slot, e.g., "nrofX2slots" slot.

"XsymbolFreq" can indicate a number of symbols across frequency for a slot. For instance, when XsymbolFreq is a value of three, there can be three symbols across frequency. When XsymbolFreq is a value of sixteen, there can be sixteen symbols across frequency. The number of symbols across frequency can indicate the number of bandwidth units.

The configuration data can include any appropriate combination of xFlexible slots, xFlexible symbols, or both. The configuration data can be received by all user equipment in a base station's cell. The configuration data can be received by a subset of user equipment in a base station's cell, e.g., as part of user equipment specific configuration parameters. In some implementations, a pattern can include only the first number of xFlexible slots and the first number of xFlexible symbols, and not the second number of xFlexible slots or symbols. In some implementations, a pattern can include only the second number of xFlexible slots and the second number of xFlexible symbols, and not the first number of xFlexible slots or symbols.

TABLE 3 xFlexible Slot Configuration Parameters nrofX1slots: 0 to 320: number of consecutive xFlexible slots in each pattern, e.g., following the downlink slots, earlier flexible slots, or either
nrofX2slots: 0 to 320: number of consecutive xFlexible slots in each pattern, e.g., preceding the uplink slots, latter flexible slots, or either
nrofX1symbols: 0 to 13: number of consecutive xFlexible symbols in the beginning of the slot following the last full xFlexible slot

TABLE 3-continued xFlexible Slot Configuration Parameters nrofX2symbols: 0 to 13: number of consecutive xFlexible symbols in the end of the slot preceding the first full xFlexible slot
XsymbolFreq: signaling of number of UL/DL symbols across frequency In FIG. 2C, the slot pattern 202c is D, xF, F, U. In this example, the slot pattern 202c includes one group of xFlexible slots 206f-g followed by one group of flexible slots 204f-h.

The user equipment that receives the slot pattern 202c can use one of the xFlexible slots 206g for a combination of downlink and uplink transmissions. For instance, the user equipment can use a first bandwidth unit 208g for downlink transmissions and second and third bandwidth units for uplink transmissions.

In this example, the user equipment can use a bitmap 210c that includes bits for blocks of bandwidth units, e.g., to reduce a size of the bitmap 210c compared to the bitmap 210a. The user equipment can generate the bitmap 210c to indicate that first and second bandwidth units, 0 and 1, are for a first transmission type, e.g., downlink, using a first bit b0. The user equipment can generate the bitmap 210c to indicate that the third and fourth bandwidth units, 2 and 3, are for a second transmission type, e.g., uplink, using a second bit b1. The user equipment can generate the bitmap 210c to indicate that the fifth and sixth bandwidth units, 4 and 5, are for a third transmission type, e.g., uplink, using a third bit b2.

For instance, the bandwidth unit 208g can represent two bandwidth units 0 and 1. The bandwidth unit 208h can represent two bandwidth units 2 and 3. The bandwidth unit 208i can represent two bandwidth units 4 and 5.

User equipment can use other appropriate signaling to indicate a configuration for a slot pattern. For instance, the user equipment can include a signal that includes: [nrofswitches] nrofDLsymbols0, nrofULSymbols0, nrofDLSymbols1, nrofULSymbols2, nrofULSymbol{nrofswitches−1}. The signal can include separate parameters for each xFlexible slot, use the same parameter set for each xFlexible slot, or use the same parameter set for multiple xFlexible slots, which number of slots can be identified using a parameter, e.g., nrofXFlexibleslots. For instance, the "nrofswitches" parameter can indicate a new set of symbols for an xFlexible slot.

Here, "nrofswitches" indicates the number of switches of transmission types within an xFlexible slot. "nrofDLsymbols" indicates the number of consecutive downlink symbols. For instance, "nrofDLsymbols0" can indicate the number of consecutive downlink symbols at a predetermined extreme within the xFlexible slot, while "nrofDLsymbols1" can indicate the number of consecutive downlink symbols that follow a set of consecutive uplink symbols. The extreme can be the highest bandwidth units, or the lowest bandwidth units.

"nrofULSymbols" indicates the number of consecutive uplink symbols. "nrofULSymbols0" can indicate the number of consecutive uplink symbols following the first set of consecutive downlink symbols, "nrofDLsymbols0", or the number of consecutive uplink symbols at a predetermined extreme within the xFlexible slot.

In some implementations, the user equipment can signal a slot configuration using start locations and sizes. A base station that receives the signal can use the start locations and sizes to determine corresponding bandwidth units and the transmission types for those bandwidth units. For instance, the user equipment can use the format: [start1, size1], [start2, size2], . . . . This format can optionally include a bit that indicates the corresponding transmission type. In some examples, the user equipment can always use a predetermined transmission type for the first start location and alternate between transmission types for each parameter pair. For instance, "start1" can indicate a bandwidth unit, e.g., the bandwidth unit 208g, for downlink transmissions. Here, "size1" can have a value of one given that there is one bandwidth unit for downlink transmissions. "start2" can indicate the location for the second bandwidth unit 208h while "size2" can have a value of two to indicate that both the second and the third bandwidth units 208h-i are used for uplink transmissions.

In some implementations, the user equipment can signal a slot configuration using start locations and end locations. A base station that receives the signal can use the start locations and end locations to determine corresponding bandwidth units and the transmission types for those bandwidth units. For instance, the user equipment can use the format: [start1, end1], [start2, end2], . . . . This format can optionally include a bit that indicates the corresponding transmission type. In some examples, the user equipment can always use a predetermined transmission type for the first start location and alternate between transmission types for each parameter pair. For instance, "start1" can indicate a bandwidth unit, e.g., the bandwidth unit 208g, for downlink transmissions. Here, "end1" can also identify the location of the first bandwidth unit 208g to indicate that only a single bandwidth unit is used in this xFlexible slot 206g for downlink transmissions. "start2" can indicate the location for the second bandwidth unit 208h while "end2" can identify the location of the third bandwidth unit 208i to indicate that the second and third bandwidth units 208h-i are used for uplink transmissions.

In some implementations, a base station can send configuration parameters to a specific user equipment. Table 4, below, includes an example of configuration parameters for cross-division duplexing. Although the base station can send the same or similar configuration parameters to each user equipment in the base station's cell, the base station can send separate messages to each user equipment or to subsets of the user equipment. For instance, the base station can send configuration parameters in tdd-UL-DL-configurationDedicated.

The base station can send the configuration parameters in a radio resource control ("RRC") signal. The RRC signal can be a semi-static user equipment specific configuration.

As indicated in Table 4, below, the configuration parameters can include a type field, e.g., a flag, that indicates a type for symbols that are not downlink or uplink. For instance, when the type field has a first value, e.g., zero, the configuration parameters can indicate that any slots not explicitly defined are flexible slots, e.g., as in a legacy system. When the type field has a second value, e.g., one, the configuration parameters can indicate that any slots not explicitly defined are xFlexible slots for cross-division duplexing ("xDD").

TABLE 4

Device Specific Configuration Parameters slotIndex: 0 to 319, identifies a slot within a slot configuration period given in tdd-UL-DL-configurationDedicated
allDownlink: indicates an all symbols downlink
allUplink: indicates an all symbols uplink TABLE 4-continued Device Specific Configuration Parameters nrofDownlinkSymbols: indicates Number of consecutive DL symbols in the beginning of the slot identified by slotIndex. If the field is absent the UE assumes that there are no leading DL symbols
nrofUplinkSymbols: indicates Number of consecutive UL symbols in the end of the slot identified by slotIndex. If the field is absent the UE assumes that there are no trailing UL symbols
To signal information for xDD, Type field:
0: signaling is Flexible for rest of BW as in legacy
1: signaling is xFlexible for rest of BW for xDD When a non-xDD enabled device receives the configuration parameters, it is unable to detect the type field. As a result, the non-xDD enabled device would default to using the undefined slots as flexible slots. This means that the non-xDD device would use all slots for a particular time as either downlink or uplink but not both, which is compatible with cross-division duplexing.

When a base station does not receive a signal that indicates that different bandwidth units are different transmission types, the base station can determine that the signal was sent by a non-xDD enabled device. As a result, the base station can transmit data with the non-xDD enabled device using TDD.

When an xDD enabled device receives the configuration parameters described in Table 4, the xDD device can determine which symbols are downlink, e.g., using "nrofDownlinkSymbols", which symbols are uplink, e.g., using "nrofUplinkSymbols", or both. The xDD enabled device can then analyze the type field to determine whether the remaining symbols are flexible or xFlexible. The xDD enabled device can then transmit data with the base station from which the configuration parameters were received according to the type field.

In some implementations, when the configuration parameters indicate that all of the symbols are either uplink or downlink, e.g., based on "allDownlink" or "allUplink", the xDD enabled device can determine to skip analysis of the type field. For instance, the xDD enabled device can determine that all of the symbols are of a predetermined type and that there are not any flexible or xFlexible slots and the type field need not be analyzed.

Figure 3:
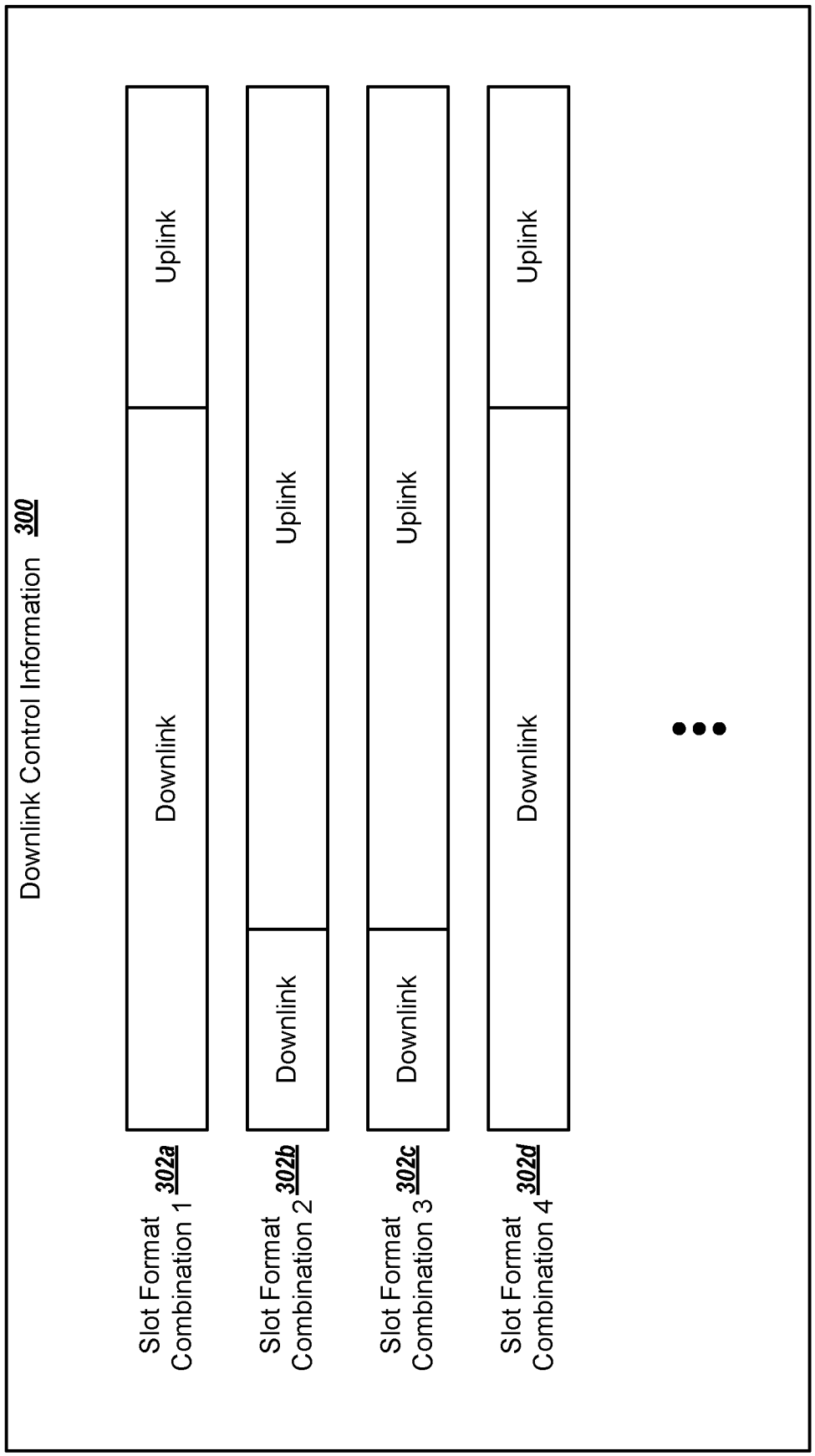
FIG. 3 depicts an example of downlink control information ("DCI") that is cross-division duplex enabled.

FIG. 3 depicts an example of downlink control information ("DCI") 300 that is cross-division duplex enabled. In some examples, flexible, xFlexible, or both, symbols can be dynamically configured using the DCI 300. For instance, after the RRC semi-static cell specific, the user equipment specific, or both, configurations are defined, the base station can dynamically configure any remaining flexible, xFlexible, or both, symbols using the DCI 300.

The DCI 300 includes configuration parameters for both frequency and time. For instance, the DCI includes, for a flexible or xFlexible symbol, configuration parameters for bandwidth units, such as frequency ranges, bandwidth parts, or channel bandwidth. In some examples, the DCI 300 can include a slot format indicator ("SFI")— radio network temporary identifier ("RNTI") for each of multiple different bandwidth units. The DCI 300 can include a slot format combination that is a set of SFIs that is valid over multiple slots.

As shown in FIG. 3, the DCI 300 includes four slot format combinations 302a-d for the same time duration. Each of the slot format combinations 302a-d is for a different bandwidth unit. For instance, a first slot format combination 302a is for a first bandwidth unit, a second slot format combination 302b is for a second bandwidth unit, a third slot format combination 302c is for a third bandwidth unit, and a fourth slot format combination is for a fourth bandwidth unit.

The first and the fourth slot format combinations 302a, 302d can indicate that the corresponding bandwidth units should be used for a first, larger quantity of downlink slots or symbols. The first and the fourth slot format combinations 302a, 302d can indicate that the downlink slots are followed by a second, smaller quantity of uplink slots or symbols. The first, larger quantity is larger than the second, smaller quantity.

The second and third slot format combinations 302b-c can indicate that the corresponding bandwidth units should be used for a third, smaller quantity of downlink slots or symbols. The second and third slot format combinations 302b-c can indicate that the downlink slots are followed by a fourth, larger quantity of uplink slots or symbols. The third, smaller quantity is smaller than the fourth, larger quantity.

The bandwidth units for the slot format combinations 302a-d can be any appropriate size. For instance, the sizes of the bandwidth units can be equal, unequal, or a combination of both. In some examples, the first and second slot format combinations 302a-b can have a first size for their corresponding bandwidth units. The third and fourth slot format combinations 302c-d can have a second, different size for their corresponding bandwidth units, that is a different size than the first size.

In some examples, the bandwidth units can be preconfigured. For instance, the base station can indicate in the DCI 300 the parameters for the bandwidth units for the slot format combinations 302a-d. The parameters can indicate frequency ranges, bandwidth parts, per channel bandwidths, or a combination of these, for each of the slot format combinations 302a-d.

In some examples, the bandwidth units can be implicitly defined. For instance, the DCI 300 can indicate a quantity of slot format indicators for a particular time duration and a user equipment that receives the DCI 300 can determine the parameters for the bandwidth parts based on the quantity of the slot format indicators. For example, when the total bandwidth is x, and the DCI 300 includes y slot format indicators, the user equipment can determine that each bandwidth part is x/y in size.

In some examples, the DCI 300 can indicate the bandwidth parts for the slot format combinations 302a-d using a bitmap. For instance, the bitmap [1 1 0 0] can indicate that there are four slot format combinations, the first two are allocated for downlink transmissions, e.g., when DL=1, and the second two are allocated for uplink transmissions, e.g., when UL=0. When DCI 300 includes a bitmap of [1 1 0 0 1 1], the DCI 300 identifies six slot format combinations, the first two of which are for downlink transmissions, the middle two of which are for uplink transmissions, and the latter two of which are for downlink transmissions.

In the example with four slot format combinations, the bandwidth units for each combination can be based on the total amount of bandwidth units divided by four. In the example with six slot format combinations, the bandwidth units for each combination can be based on the total amount of bandwidth units divided by six.

In some implementations, multiple user equipment devices can receive the same DCI 300. The user equipment devices can use the RNTI to determine the slot format combinations specific to that device. For instance, a user equipment can determine which slot format combinations have the same RNTI as the user equipment and use those slot format combinations for transmissions with the base station from which the user equipment received the DCI 300.

A base station can generate the DCI 300 to include the multiple slot format combinations 302a-d that are each for a different bandwidth unit. For example, the base station can indicate that there are four bandwidth units, each of a specific size. In some examples, the base station can signal four SFIs and the user equipment ("UE") would implicitly divide the transmission bandwidth ("BW") into four equal parts. In some examples, the base station can explicitly signal the number of physical resource blocks ("PRBs") associated with each SFI. In some examples, the base station can signal the number of bandwidth units associated with each SFI.

Figure 4A:
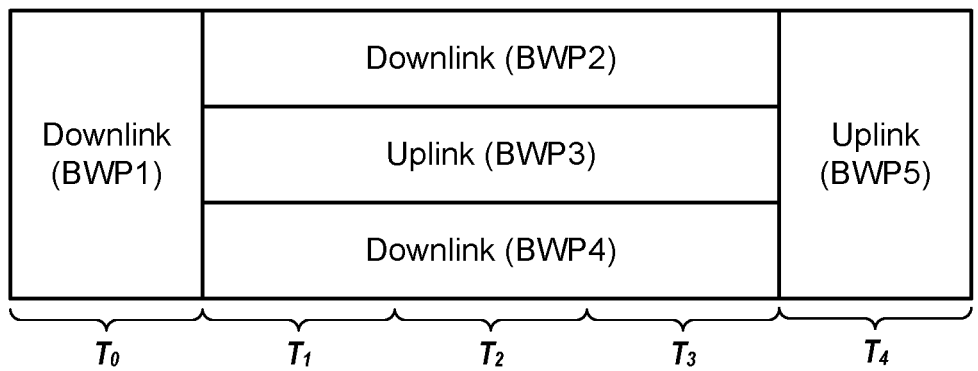
FIGS. 4A-B depict an example of a base station bandwidth part pattern for cross-division duplexing transmissions.
Figure 4B:
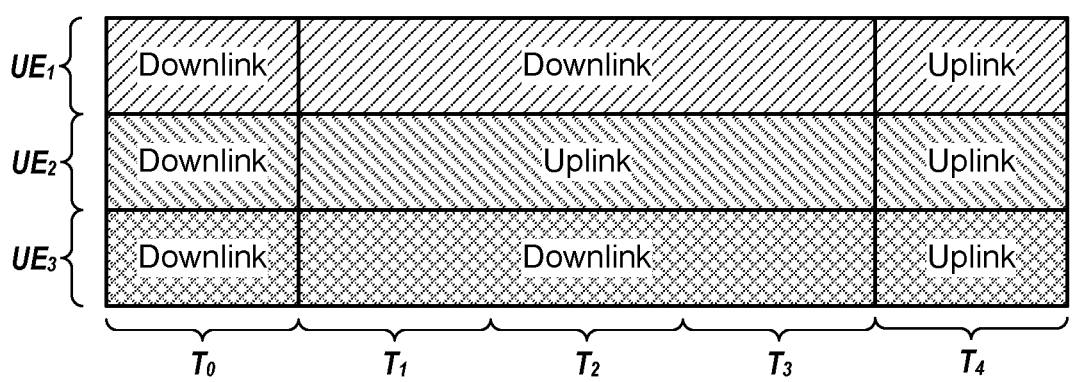

FIGS. 4A-B depict an example of a base station bandwidth part pattern 400 for cross-division duplexing transmissions. The bandwidth part pattern 400 is show from two perspectives: that of the base station in FIG. 4A and that of user equipment in FIG. 4B. The different devices can have different perspectives when some devices, e.g., the base station, can use cross-division duplexing while other devices, e.g., the user equipment, cannot. For instance, the base station can be cross-division duplexing enabled while the user equipment is not. Having some devices that are cross-division duplexing enabled while others are not can reduce overall system complexity, e.g., because only the some devices need to be configured for cross-division duplexing. For instance, user equipment that is not cross-division duplexing enabled does not need new signaling for cross-division duplexing.

As shown in FIG. 4A, from the base station perspective, the bandwidth part pattern 400 includes multiple time slots $T_0$ through $T_4$. The base station can configure some of the time slots, e.g., $T_0$ and $T_4$, using time-division duplexing. For instance, the base station can configure the first time slot $T_0$ for downlink transmissions across a first bandwidth part BWP1 and a fifth time slot $T_4$ for uplink transmissions across a fifth bandwidth part BWP5.

The base station configures the three intermediate time slots $T_1$, $T_2$, and $T_3$ using cross-division duplexing. For these time slots, the base station can configure a second bandwidth part BWP2 for downlink transmission across all three time slots $T_1$, $T_2$, and $T_3$. The base station can configure a third bandwidth part BWP3 for uplink transmissions across all three time slots $T_1$, $T_2$, and $T_3$. The base station can configure a fourth bandwidth part BWP4 for downlink transmissions across all three time slots $T_1$, $T_2$, and $T_3$.

The base station can configure the transmissions types, e.g., downlink, uplink, flexible, or xFlexible, for the time slots $T_0$ through $T_4$ based on known or predicted transmissions for multiple user equipment $UE_1$ through $UE_3$ with which the base station communications. Although the example here describes five time slots $T_0$ through $T_4$ and three user equipment $UE_1$ through $UE_3$, other combinations of numbers of time slots and user equipment can be used in a similar manner. For instance, the base station can use fourteen time slots to communicate with sixty-eight user equipment devices.

As shown in FIG. 4B, the bandwidth part pattern 400 can include multiple different bandwidth units each of which is assigned to one of the user equipment $UE_1$ through $UE_3$. This can cause the base station, e.g., a gNB, to have, at a specific symbol in time, multiple different symbols across frequency while the user equipment have, at the specific symbol in time, only a single symbol across frequency, e.g., either downlink, uplink, or flexible. For instance, the user equipment can communicate with the base station based on the bandwidth part pattern 400 while in a time-division duplexing configuration.

A first user equipment $UE_1$ can use a respective portion of the bandwidth part pattern 400 to transmit data with the base station. During the first four time slots $T_0$ through $T_3$, the first user equipment $UE_1$ will have downlink transmissions with the base station. During the fifth time slot $T_4$, the first user equipment $UE_1$ will have uplink transmissions with the base station. Similarly, based on the bandwidth part pattern 400, a third user equipment $UE_3$ will have four slots $T_0$ through $T_3$ for downlink transmissions and one slot $T_4$ for uplink transmissions.

A second user equipment $UE_2$ can use a respective portion of the bandwidth part pattern 400 to transmit data with the base station. During the first time slot $T_0$, the second user equipment $UE_2$ can have downlink transmissions with the base station. During the last four time slots $T_1$ through $T_4$, the second user equipment $UE_2$ can have uplink transmissions with the base station.

As noted above, the base station can select the configuration for the bandwidth part pattern 400 using a transmission type, whether known or predicted, for the user equipment $UE_1$, $UE_2$, and $UE_3$. When the base station will have more downlink transmissions with the user equipment $UE_1$ and $UE_3$, such as sending video content to the user equipment, the base station can include more downlink transmission slots for the respective user equipment in the bandwidth part pattern 400 compared to when the base station will have more uplink transmissions with other user equipment $UE_2$, such as receiving a live video fee.

As shown in the bandwidth part pattern 400, the base station can configure the bandwidth parts for each user equipment to have one symbol, e.g., for transmission type, across frequency. The base station can use bandwidth part switching, described in more detail below, to signal the slot configuration to the respective user equipment. In some examples, the base station can use bandwidth part switching for half-duplex enabled user equipment. The base station can use bandwidth part switching, or not, for full-duplex enabled user equipment. When the base station communicates with full-duplex enabled user equipment, the base station need not use bandwidth part switching which can result in removing a delay that would be incurred for bandwidth part switching.

FIGS. 5A-D depict examples of bandwidth part switching using two slot formats 500a-b. A base station can use bandwidth part switching to indicate slot format 500a-b switching to a user equipment. The slot format 500a-b switch can be from using a first set of bandwidth units for a first transmission type to using a second, different set of bandwidth units for the first transmission type.

Figures 5A, 5B, 5C, 5D:
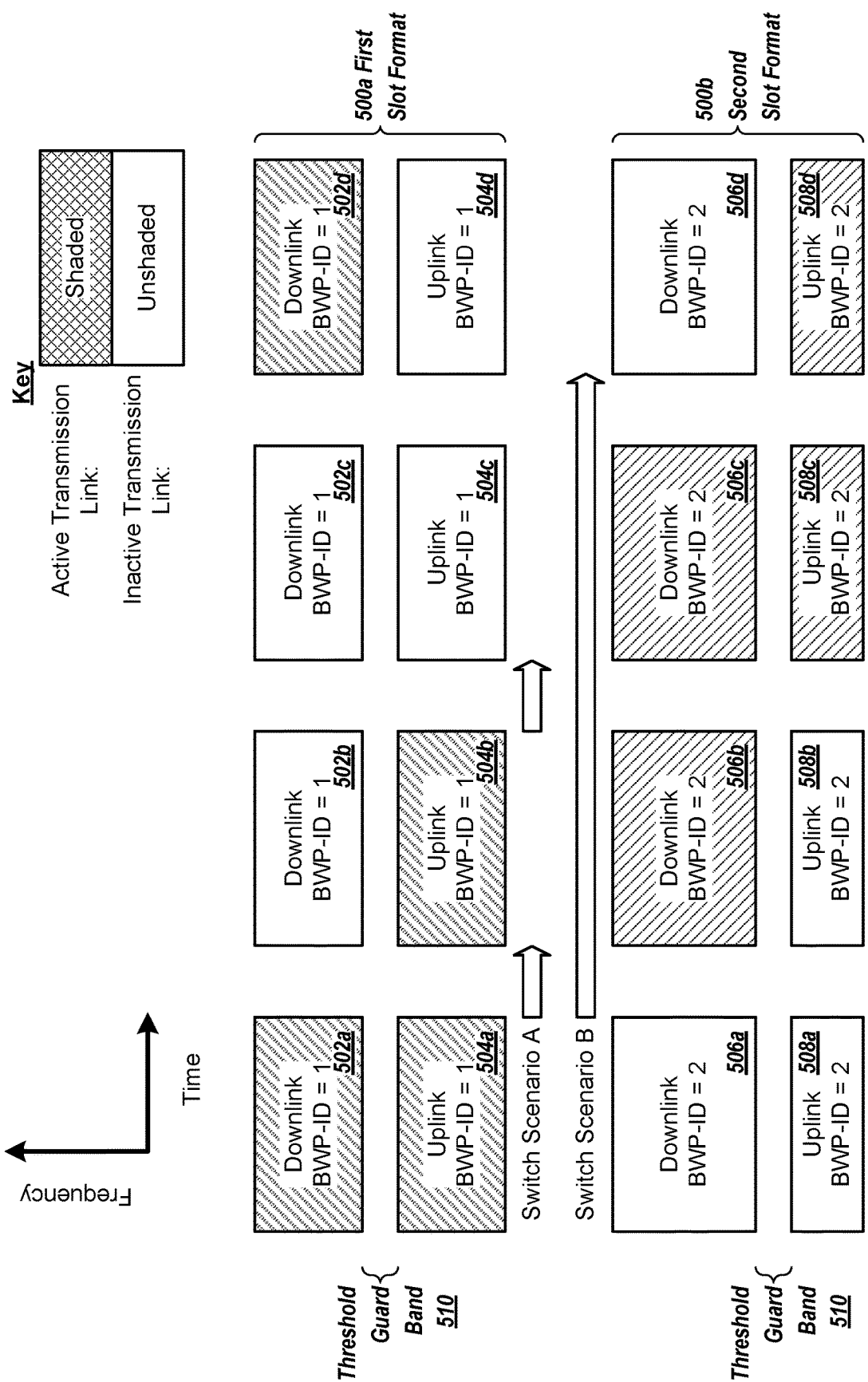
FIGS. 5A-D depict examples of bandwidth part switching using two slot formats.

In FIG. 5A, a base station has two slot formats 500a-b with which it can communicate with a user equipment. In some examples, the base station can use the bandwidth parts 502-504 from the first slot format 500a with some, but not all, of the bandwidth parts 506-508 from the second slot format 500b. In some implementations, the base station can only use the bandwidth parts from the respective slot format 500a-b.

For example, the base station can use different bandwidth parts that have the same identifier at the same time. When the base station switches from a bandwidth part with a first identifier to a bandwidth part with a second, different identifier, the base station indicates, to the user equipment with which the base station is transmitting data, that the user equipment should switch any other bandwidth parts to have the same identifier as the bandwidth part to which the base station switched.

In FIG. 5A, a first bandwidth part 502a has an identifier BWP-ID=1, and a second bandwidth part 504a has the same identifier BWP-ID=1. Both of the first and the second bandwidth parts 502a and 504a are part of the first slot format 500a. A third bandwidth part 506a and a fourth bandwidth part 508a both have an identifier BWP-ID=2 and are part of the second slot format 500b.

When the base station switches a downlink transmission from the first bandwidth part 502b to the third bandwidth part 506b, which switch is shown in FIG. 5B, the identifier for the downlink transmission changes from BWP-ID=1 to BWP-ID=2. The base statin can use this identifier change to indicate a switch from the first slot format 500a to the second slot format 500b.

The user equipment that is transmitting data with the base station, and receives data that indicates the switch to the downlink transmission, can detect the switch from the first bandwidth part 502b to the third bandwidth part 506b. Responsive to the detected switch, the user equipment can determine whether an identifier for the bandwidth parts has changed. If so, the user equipment can determine whether another bandwidth part should also be switched. If not, the user equipment can determine to skip switching another bandwidth part based on the detected switch. This can occur when the user equipment is using a single transmission type, e.g., for all bandwidth parts, in a slot or between slots.

The user equipment can determine whether the identifier for the bandwidth parts has changed using data that indicates the identifiers for the bandwidth parts. The user equipment can access this data from a signal received during the change from the first bandwidth part 502b to the third bandwidth part 506b. The user equipment can access this data in a database, e.g., stored in memory on the user equipment.

When the user equipment determines that another bandwidth part should also be switched, the user equipment can determine which other bandwidth part or parts to switch. The user equipment can make this determination by analyzing the bandwidth part identifiers for any other transmissions the user equipment has. For instance, the user equipment can determine that the second bandwidth part 504b, used for uplink transmissions, has an identifier BWP=1. The user equipment can compare this identifier with the identifier for the switched to bandwidth part, e.g., the third bandwidth part 506b, using any appropriate process. When the identifiers are the same, the user equipment can determine to skip switching another bandwidth part. Based on the comparison, when the user equipment determines that the identifiers are different, the user equipment can determine that the other bandwidth part, e.g., the second bandwidth part 504b, should be switched.

The user equipment can determine another bandwidth part to switch to. The user equipment can make this determination using identifiers for the various bandwidth parts 502b, 504b, 506b, and 508b, using the slot formats 500a-b to which the bandwidth parts correspond, or another appropriate process. For instance, the user equipment can determine that the fourth bandwidth part 508b, for uplink transmissions, has the same identifier BWP-ID=2 as the third bandwidth part 506b, that the two bandwidth parts are both part of the second slot format 500b, or both.

As shown in FIG. 5C, the user equipment can switch from the second bandwidth part 504c to the fourth bandwidth part 508c for uplink transmissions. The user equipment can use any appropriate process to make this switch.

In some examples, the bandwidth parts 502-508 can have associations with other bandwidth parts, e.g., in a database. A bandwidth part can be associated with one other bandwidth part, e.g., the third bandwidth part 506 can be associated with only the fourth bandwidth part 508. A bandwidth part can be associated with two or more other bandwidth parts, e.g., the first bandwidth part 502 can be associated with both the second bandwidth part 504 and the fourth bandwidth part 508. The associations can be identified in memory, e.g., in a database stored on the user equipment.

As shown in FIG. 5A, the user equipment has both the first and the second bandwidth parts 502a, 504a active, e.g., is transmitting data with a device using the bandwidth parts 502a, 504a. When the user equipment detects a change in the bandwidth part used for uplink transmissions, from the second bandwidth part 504d to the fourth bandwidth part 508d, as shown in FIG. 5D, the user equipment can determine whether to change the bandwidth part for the downlink transmissions. Because the first bandwidth part 502d is associated with both the second bandwidth part 504d and the fourth bandwidth part 508d, the user equipment can determine to skip switching another bandwidth part.

The user equipment can use a threshold guard band 510 to determine whether to switch another bandwidth part. For instance, the user equipment can maintain at least a threshold guard band between bandwidth parts. Parameters for the threshold guard band can be selected to reduce a likelihood of interference between the bandwidth parts adjacent to the threshold guard band, such as self-interference between uplink and downlink transmissions. A user equipment can use the threshold guard band for sub-band full-duplex communications using cross-division duplexing.

When the user equipment is communicating using different transmission types across different bandwidth parts, and detects a change in a bandwidth part used for one of the transmission types, the user equipment can determine whether the threshold guard band 510 is still satisfied. For example, when the user equipment detects a change from the first bandwidth part 502a, shown in FIG. 5A, to the third bandwidth part 506b, shown in FIG. 5B, the user equipment can determine whether a bandwidth band between the currently active bandwidth parts 504b and 506b satisfies the threshold guard band 510.

In some examples, the bandwidth band can satisfy the threshold guard band when a size of the bandwidth band is greater than a size of the threshold guard band. The bandwidth band can satisfy the threshold guard band when a size of the bandwidth band is the same as or greater than a size of the threshold guard band.

When the user equipment determines that the bandwidth band does not satisfy the threshold guard band, the user equipment determines to switch another bandwidth part. In FIG. 5B, with the second and third bandwidth parts 504b, 506b active, if the second bandwidth part 504b were included in the same slot as the third bandwidth part 506b, the second bandwidth part 504b would be adjacent to the third bandwidth part 506b across frequency. As a result, the bandwidth band between the second bandwidth part 504b and the third bandwidth part 506b would be zero and would not satisfy the threshold guard band 510. In this example, the user equipment can switch the uplink transmission from the second bandwidth part 504c to the fourth bandwidth part 508c as shown in FIG. 5C.

When the user equipment determines that the bandwidth band satisfies the threshold guard band, the user equipment can determine to skip switching another bandwidth part based on the bandwidth part switch. For instance, the user equipment can communicate with a base station using the first and second bandwidth part 502a, 504a, as shown in FIG. 5A. The user equipment can receive a signal from the base station to switch the uplink transmission from the second bandwidth part 504d to the fourth bandwidth part 508d, as shown in FIG. 5D. The user equipment can determine the bandwidth band between the first bandwidth part 502d and the fourth bandwidth part 508d that are active. The user equipment can determine the bandwidth band using a distance, e.g., in frequency, between the two active bandwidth parts. Since the bandwidth band has a size greater than the threshold guard band, the user equipment can determine to skip switching another bandwidth part. For example, the user equipment can determine that it does not need to switch the first bandwidth part 502d for the downlink transmission to another bandwidth part, e.g., the third bandwidth part 506d.

In some implementations, a device can use a bandwidth part configuration to determine whether to switch another bandwidth part based on a prior bandwidth part switch. For instance, a base station can send a signal to a user equipment that indicates a change from the first bandwidth part 502a to a third bandwidth part 506a. The signal can also indicate whether or not the user equipment should change any other active bandwidth parts, such as the second bandwidth part 504a to the fourth bandwidth part 508a.

In some implementations, for unpaired spectrum, uplink and downlink bandwidth parts, e.g., 502a and 504a, can have the same bandwidth part identifier, same numerology, same frequency, or a combination of two or more of these. The uplink and downlink bandwidth parts can have the same or different sizes. The uplink and downlink bandwidth parts can have different center frequencies. For instance, the bandwidth parts can have a frequency-division duplexing layout as part of a cross-division duplexing transmission.

A device can use bandwidth part switching to switch, within a cross-division duplexing transmission, between, or among, time-division duplexing ("TDD") layouts, frequency-division duplexing ("FDD") layouts, or both. For instance, the device can use bandwidth part switching to switch from a TDD layout to a FDD layout. The device can use bandwidth part switching to switch from a FDD layout to a TDD layout. In some examples, the device can use bandwidth part switching, in an xDD transmission, to switch between different FDD layouts.

In some implementations, a device can have more than two active bandwidth parts. Although the examples above described switching from one bandwidth part to another when two bandwidth parts are active, similar processes can apply when the device is transmitting data using three or more bandwidth parts. For example, when the device, e.g., a user equipment, transmits data with a base station using three bandwidth parts, two for downlink transmissions and the third for uplink transmissions, the device can determine whether a switch for one of those bandwidth parts indicates that the device should switch one or both of the other bandwidth parts. The device can make this determination using any appropriate process, such as using bandwidth part identifiers, a threshold guard band, or both.

In these implementations, the device can determine to switch one of the two other bandwidth parts but not both. For instance, when the device uses a threshold guard band, the device can determine that the switched bandwidth part has a first and a second bandwidth band with the two other bandwidth parts, e.g., when the switched bandwidth part is between the two other bandwidth parts. The device can determine that the first bandwidth band satisfies the threshold guard band 510 and the device can skip switching a corresponding bandwidth part. The device can determine that the second bandwidth band does not satisfy the threshold guard band 510 and that the device should switch the corresponding bandwidth part.

In some implementations, a device can use downlink control information to determine when to switch bandwidth parts. For instance, a user equipment can receive downlink control information scheduling data that indicates that the user equipment should switch an active downlink bandwidth part to a target downlink bandwidth part. The user equipment can switch the active uplink bandwidth part if the target downlink bandwidth part is not associated with the active uplink bandwidth part.

In some examples, downlink control information can indicate multiple or all bandwidth parts that should be switched. For example, a user equipment can receive downlink control information scheduling data that indicates that the user equipment should switch both an active uplink and an active downlink bandwidth parts to respective target bandwidth parts. When the user equipment is only transmitting data using two bandwidth parts, this downlink control information indicates all bandwidth parts that should be changed.

When the user equipment has three bandwidth parts and receives downlink control information indicating a switch for two of the bandwidth parts, the user equipment might not change all three bandwidth parts. For instance, the downlink control information can indicate that only the two identified bandwidth parts should be switched. In some examples, the user equipment can determine whether the third bandwidth part should also be switched.

In some examples, the user equipment can switch from a first number of bandwidth parts to a second, different number of bandwidth parts, from a first number of transmissions to a second, different number of transmissions, or both. For instance, a user equipment can have an uplink and a downlink transmission with a base station during a first time slot. The user equipment can determine to switch the bandwidth parts for the uplink and downlink transmissions to different bandwidth parts that support first and second downlink transmissions and an uplink transmission. As a result, the number of transmissions the user equipment has with the base station changes.

Figure 6:
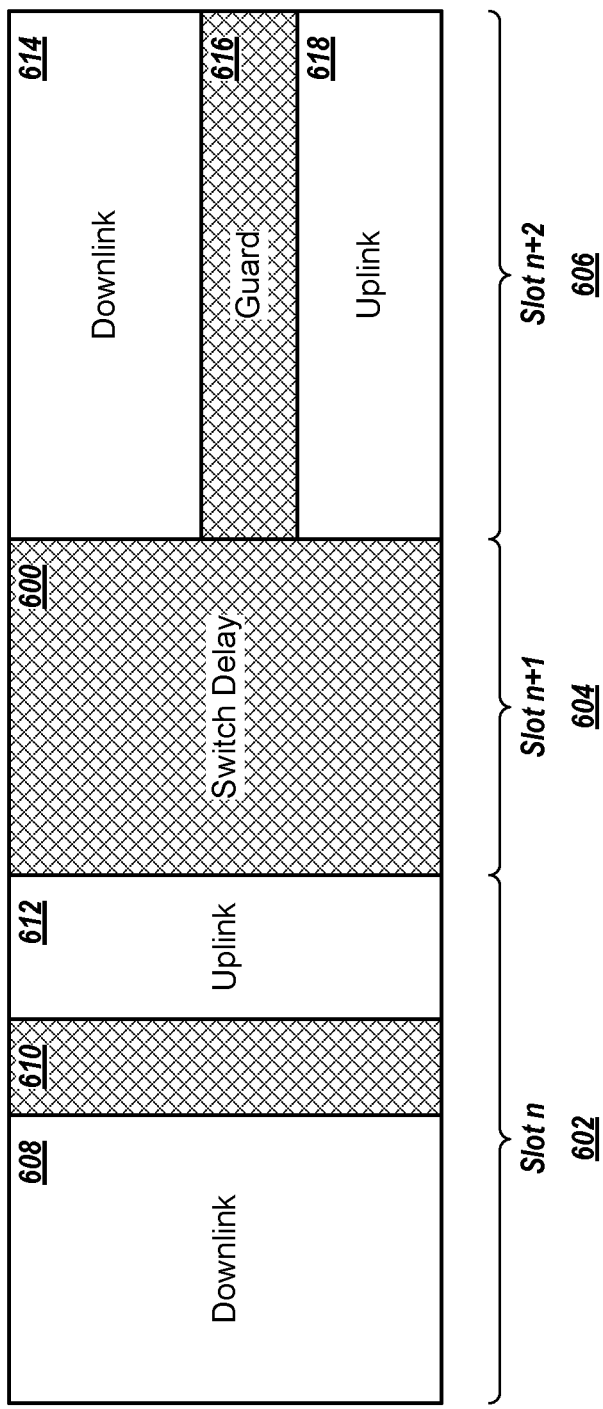
FIG. 6 depicts an example of a switch delay for a switch between different slot layouts.

FIG. 6 depicts an example of a switch delay 600 for a switch between different slot layouts. A device can use the switch delay 600 when switching between TDD layouts, FDD layouts, or a combination of both.

For example, a device, such as a user equipment, can have multiple slots across time, such as the slot n 602, slot n+1 604, and slot n+2 606. Slot n 602 can have a first layout, such as a TDD layout with multiple downlink bandwidth parts 608 and multiple uplink bandwidth parts 612 separated across time by a guard 610.

To switch from the slot n 602, with the first layout, to a slot n+2 with a second, different layout, the device can use a switch delay 600. The slot n+2 can have a FDD layout with multiple second downlink bandwidth parts 614 separated from multiple second uplink bandwidth parts 618 using a second guard 616.

To determine properties for the switch delay 600, the device can use subcarrier spacing ("SCS") data. For instance, the device can determine a smallest subcarrier spacing across the subcarrier spacings for the downlink bandwidth parts 608, the uplink bandwidth parts 612, the second downlink bandwidth parts 614, and the second uplink bandwidth parts 618. The device can use any appropriate process by which to determine the smallest subcarrier spacing, e.g., by comparing properties for the four subcarrier spacings.

In some implementations, the device can determine the smallest subcarrier spacing from more than four subcarrier spacings or from three subcarrier spacings. For instance, based on a quantity of bandwidth parts in the slot n 602 and the slot n+2 606, the device might use three subcarrier spacings or five subcarrier spacings.

The device can then use the smallest subcarrier spacing to determine a subcarrier spacing for the switch delay 600, and the slot n+1 604. For example, the device can access a table that indicates subcarrier spacings and a time period, quantity of slots, or both, for the switch delay. For example, the device can use fewer than two slots for a new radio slot length of 0.5 milliseconds, fewer than three slots for a new radio slot length of 0.25 milliseconds, or fewer than six slots for a new radio slot length of 0.125 milliseconds.

The device can use any appropriate switch delay 600. In some examples, the device can use one slot for a new radio slot length of 1 millisecond, two slots for a new radio slot length of 0.5 milliseconds, three slots for a new radio slot length of 0.25 milliseconds, or six slots for a new radio slot length of 0.125 milliseconds. In some examples, the device can use more than one slot for a new radio slot length of 1 millisecond, more than two slots for a new radio slot length of 0.5 milliseconds, more than three slots for a new radio slot length of 0.25 milliseconds, or more than six slots for a new radio slot length of 0.125 milliseconds.

Although FIG. 6 depicts the slot n+1 604 for the switch delay 600, the switch delay can include more than one slot. The size of the slot n+1 604 for the switch delay, e.g., the time period, can be different than the sizes of the other slots n 602 and n+1 606.

In some examples, the device can determine a switch delay 600 for unpaired spectrum. For instance, the device can determine a switch delay 600 when switching between a TDD slot n 602 and a FDD slot n+2 606. The values use for the switch delay for bandwidth units within unpaired spectrum can be less than the values defined in Table 8.6.2-1 of 3GPP TS 38.133. For instance, for an SCS=30 kHz, instead of two slots, the device can use a single slot for the switch delay 600.

FIG. 7 is a flow diagram of an example process 700 for communication between devices using cross-division duplexing configuration data. For example, the process 700 can be used by the base station 102 or the user equipment 104a-b from the environment 100.

A first device determines, for a symbol in a time slot of a cross-division duplex transmission link between the first device and a second device, that the first device can use a combination of multiple different symbol types across frequency to communicate with the second device at the symbol (702). The first device can make this determination using cell-specific, device-specific, or both, configuration data that indicates, for each of multiple symbols across time including the symbol, various combinations of two or more symbol types from the multiple different symbol types to use to communicate across the respective symbol. The cell-specific configuration data can include tdd-UL-DL-ConfigurationCommon, tdd-UL-DL-ConfigurationCommonXDD, or both. The device-specific configuration data can include tdd-UL-DL-Configuration-Dedicated. Although various examples described in this specification refer to cell-specific configuration data, device-specific configuration data can be used instead of or in addition to the cell-specific configuration data when appropriate.

The configuration data can include data stored in a memory, such as in a database. For instance, when the first device is a base station, the base station can access the configuration data in a memory to determine that the base station can use a combination of multiple different symbols across frequency to communicate with user equipment.

The first device communicates, with the second device using the cross-division duplex transmission link, across the symbol in the time slot using a first symbol type for a first set of bandwidth units and a second, different symbol type for a second, different set of bandwidth units (704). For instance, the first device can use a downlink symbol for the first symbol type and an uplink symbol for the second, different symbol type. The first set of bandwidth units can be used for downlink transmissions. The second set of bandwidth units can be used for uplink transmissions.

In some examples, the first device can use an uplink symbol for the first symbol type and a downlink symbol for the second, different symbol type. The first set of bandwidth units can be used for uplink transmissions. The second set of bandwidth units can be used for downlink transmissions.

In some implementations, the process 700 can include additional steps, fewer steps, or some of the steps can be divided into multiple steps. For example, the first device can send, to the second device, data that indicates, for the symbol, a first bandwidth part as the first set of bandwidth units for the first symbol type and a second bandwidth part for the second set of bandwidth units for the second, different symbol type. The process 700 can include sending data, e.g., a bitmap, that includes, for each bandwidth unit, a bit that indicates whether the bandwidth units in the corresponding group have a downlink symbol or an uplink symbol.

FIG. 8 is a flow diagram of another example process 800 for communication between devices using cross-division duplexing configuration data. For example, the process 800 can be used by the base station 102 or the user equipment 104a-b from the environment 100.

A first device determines, for a symbol in a time slot of a cross-division duplex transmission link between the first device and a second device, that the first device can use a combination of multiple different symbol types across frequency to communicate with the second device at the symbol using a downlink control information (802). The downlink control information ("DCI") can include, for each of multiple symbols across time including the symbol, a slot format combination that indicates one or more symbol types from the multiple different symbol types to use to communicate across the respective symbol using a bandwidth unit from multiple different bandwidth units. The two or more slot format combinations can each be for i) a corresponding slot formation combination and ii) have a different bandwidth unit from the multiple different bandwidth units.

The first device communicates, with the second device using the cross-division duplex transmission link, across the symbol in the time slot using a first symbol type for a first bandwidth unit from the multiple different bandwidth units and a second, different symbol type for a second, different bandwidth unit from the multiple different bandwidth units (804). For instance, the first device can use a downlink symbol for the first symbol type and an uplink symbol for the second, different symbol type. The first bandwidth unit can be used for a downlink transmission. The second bandwidth unit can be used for an uplink transmission.

In some examples, the first device can use an uplink symbol for the first symbol type and a downlink symbol for the second, different symbol type. The first bandwidth unit can be used for an uplink transmission. The second bandwidth unit can be used for a downlink transmission.

In some implementations, the process 800 can include additional steps, fewer steps, or some of the steps can be divided into multiple steps. For example, the first device can receive the downlink control information after receiving cell-specific configuration data and device-specific configuration data.

FIG. 9 is a flow diagram of an example process 900 for using a threshold guard band. For example, the process 900 can be used by the base station 102 or the user equipment 104a-b from the environment 100.

A first device identifies, for a first link with a second device, a switch in a first bandwidth part to a second bandwidth part for the first link (902). The first link can be associated with a second link having a third bandwidth part. For instance, the first device can begin a switch from a first transmission layout to a second transmission layout. The transmission layouts can be of the same type, e.g., FDD, or different types, e.g., TDD and FDD.

The first device determines, by the first device, whether a bandwidth band between the second bandwidth part and the third bandwidth part satisfies a threshold guard band (904). For example, the first device determines the boundaries for the second bandwidth part and the third bandwidth part. The first device can use the inner boundaries, toward the other bandwidth part, to determine the bandwidth band between the two bandwidth parts.

In some examples, when the two bandwidth parts overlap, e.g., in frequency, the first device can determine that there is no bandwidth band between the two bandwidth parts. This can occur when the first device is switching from FDD to TDD, TDD to FDD, or between different bandwidth parts in FDD that have different sizes.

The first device selectively determines to maintain the third bandwidth part for the second link or to switch the third bandwidth part to a fourth bandwidth part for the second link using a result of the determination whether the bandwidth band between the second bandwidth part and the third bandwidth part satisfies the threshold guard band (906). For instance, the first device can determine whether the bandwidth band satisfies the threshold guard band. Responsive to determining that the bandwidth band satisfies the threshold guard band, the first device can determine to maintain the third bandwidth part for the second link. Responsive to determining that the bandwidth band does not satisfy the threshold guard band, the first device can determine to switch the third bandwidth part to the fourth bandwidth part.

In some implementations, the process 900 can include additional steps, fewer steps, or some of the steps can be divided into multiple steps. For example, the first device can perform the process, at least in part for three or more different bandwidth parts used for transmissions at a single symbol, or slot, in time. When the first device has three bandwidth parts, and receives data indicating a switch for one of the bandwidth parts, the first device can perform the process 900 twice. When the first device has four bandwidth parts, and receives data indicating a switch for one of the bandwidth parts, the first device can perform the process 900 three times. When the first device has four bandwidth parts, and receives data indicating a switch for two of the bandwidth parts, the first device can perform the process 900 two, three, or four times, depending on the location of the bandwidth parts to each other.

FIG. 10 is a flow diagram of a process 1000 for switching bandwidth parts. For example, the process 1000 can be used by the base station 102 or the user equipment 104a-b from the environment 100.

A device determines, using configuration data that specifies a bandwidth part switch for a first link, to a switch from a first bandwidth part to a second bandwidth part for the first link (1002). The first bandwidth part can be for the first link associated with a third bandwidth part for a second link.

The device, e.g., a user equipment, can receive the configuration data from another device, e.g., a base station. For example, the device can have multiple transmission links with the other device and receive the configuration data through one of those transmission links.

The device determines whether the third bandwidth part for the second link is associated with the second bandwidth part for the first link (1004). The device can make the determining using bandwidth part identifiers, data that associates the second bandwidth part with other bandwidth parts, e.g., stored in a database, or other appropriate data.

The device selectively determines to maintain the third bandwidth part for the second link or to switch the third bandwidth part to a fourth bandwidth part for the second link using a result of the determination whether the third bandwidth part for the second link is associated with the second bandwidth part for the first link (1006). For instance, the device can determine to maintain the third bandwidth part responsive to determining that the third bandwidth part is associated with the second bandwidth part. The device can determine to switch the third bandwidth part to the fourth bandwidth part responsive to determining that the third bandwidth part is not associated with the second bandwidth part.

In some implementations, the process 1000 can include additional steps, fewer steps, or some of the steps can be divided into multiple steps. For example, the device can receive the configuration data, e.g., downlink control information, from another device.

Figure 11:
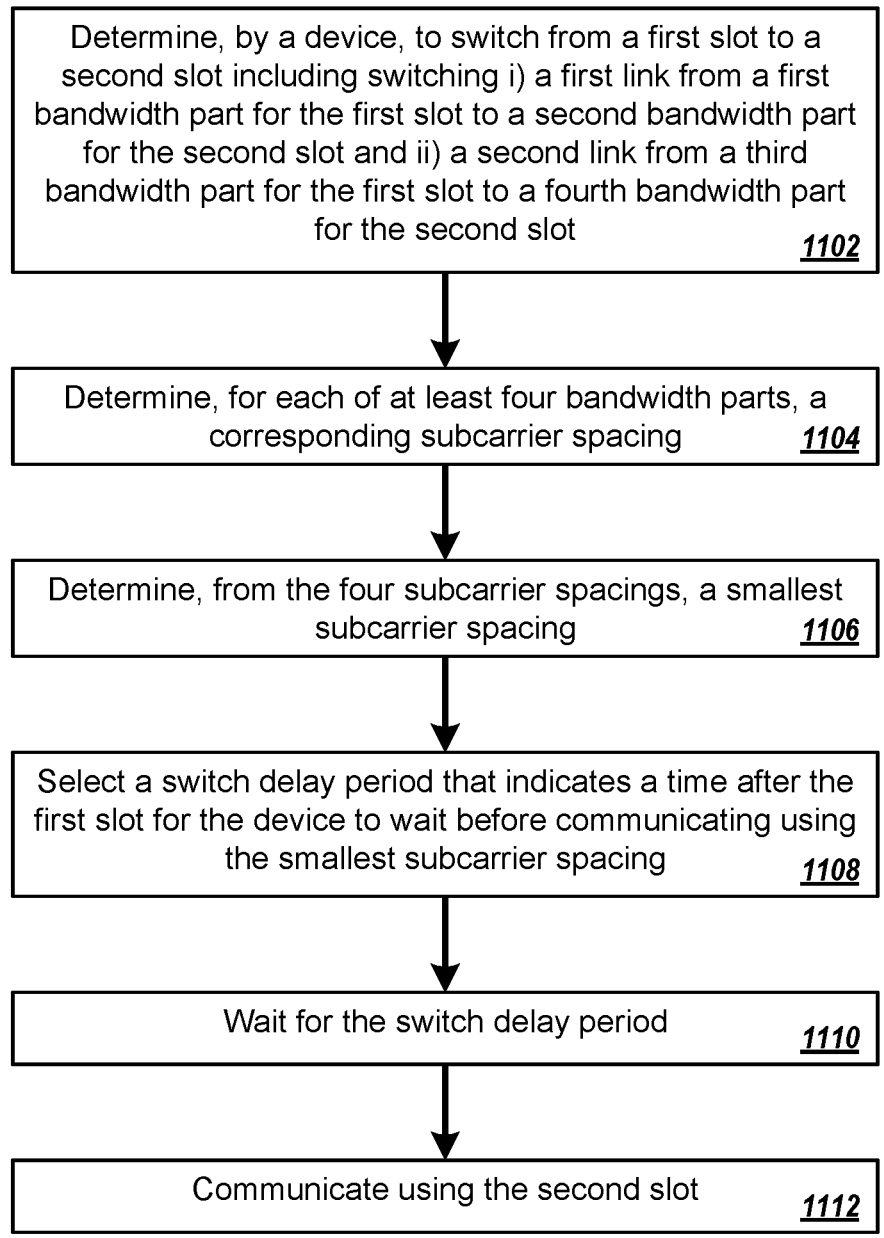
FIG. 11 is a flow diagram of a process for determining a switching delay period.

FIG. 11 is a flow diagram of a process 1100 for determining a switching delay period. For example, the process 1100 can be used by the base station 102 or the user equipment 104a-b from the environment 100.

A device determines to switch from a first slot to a second slot including switching i) a first link from a first bandwidth part for the first slot to a second bandwidth part for the second slot and ii) a second link from a third bandwidth part for the first slot to a fourth bandwidth part for the second slot (1102). In some examples, the bandwidth parts for one, but not both, of the links can be the same. For instance, either the first link or the second link, but not both, can include only one bandwidth part.

The device determines, for each of at least four bandwidth parts, a corresponding subcarrier spacing (1104). The device can use any appropriate process to determine a subcarrier spacing for a bandwidth part.

The device determines, from the four subcarrier spacings, a smallest subcarrier spacing (1106). For example, the device can compare a first subcarrier spacing with a second subcarrier spacing and, using a result of the comparison, determine which subcarrier spacing is smaller. The device can continue this process until the device determines the smallest subcarrier spacing from the four subcarrier spacings.

In some examples, one or both of the links can have more than one pair of bandwidth parts. For instance, the first link can have two pairs of bandwidth parts. In these examples, the device can determine the smallest subcarrier spacing from more than four subcarrier spacings, e.g., from six subcarrier spacings.

The device selects a switch delay period that indicates a time after the first slot for the device to wait before communicating using the smallest subcarrier spacing (1108). For instance, the device can access a table that identifies switch delay periods for corresponding subcarrier spacings. The device can use the smallest subcarrier spacing as a key to the table to determine the switch delay period. The switch delay period can be a quantity of time slots, a time duration, or another appropriate delay period.

The device waits for the switch delay period (1110). For instance, after the end of the first slot, the device can wait for the switch delay period.

The device communicates using the second slot (1112). For instance, after waiting for the switch delay period, the device can communicate with another device using the second slot. The device can be a user equipment. The other device can be a base station, e.g., a new generation node B ("gNB").

The device can communicate using both downlink transmissions and uplink transmissions. For instance, the first link can be a downlink and the second link can be an uplink. In some examples, the first link can be an uplink and the second link can be a downlink.

In some implementations, the process 1100 can include additional steps, fewer steps, or some of the steps can be divided into multiple steps. For example, the device can perform steps 1102, 1104, 1106, and 1108 without performing steps 1110 or 1112.

The specification may use the phrases "in an embodiment," "in embodiments," or "in some embodiments," which may each refer to one or more of the same or different embodiments. Furthermore, the terms "comprising," "including," "having," and the like, as used with respect to embodiments of the present disclosure, are synonymous.

Various operations may be described as multiple discrete operations in turn, in a manner that is most helpful in understanding the claimed subject matter. However, the order of description should not be construed as to imply that these operations are necessarily order dependent.

A number of implementations have been described. Nevertheless, it will be understood that various modifications may be made without departing from the spirit and scope of the disclosure. For example, various forms of the flows shown above may be used, with steps re-ordered, added, or removed.

Figure 12:
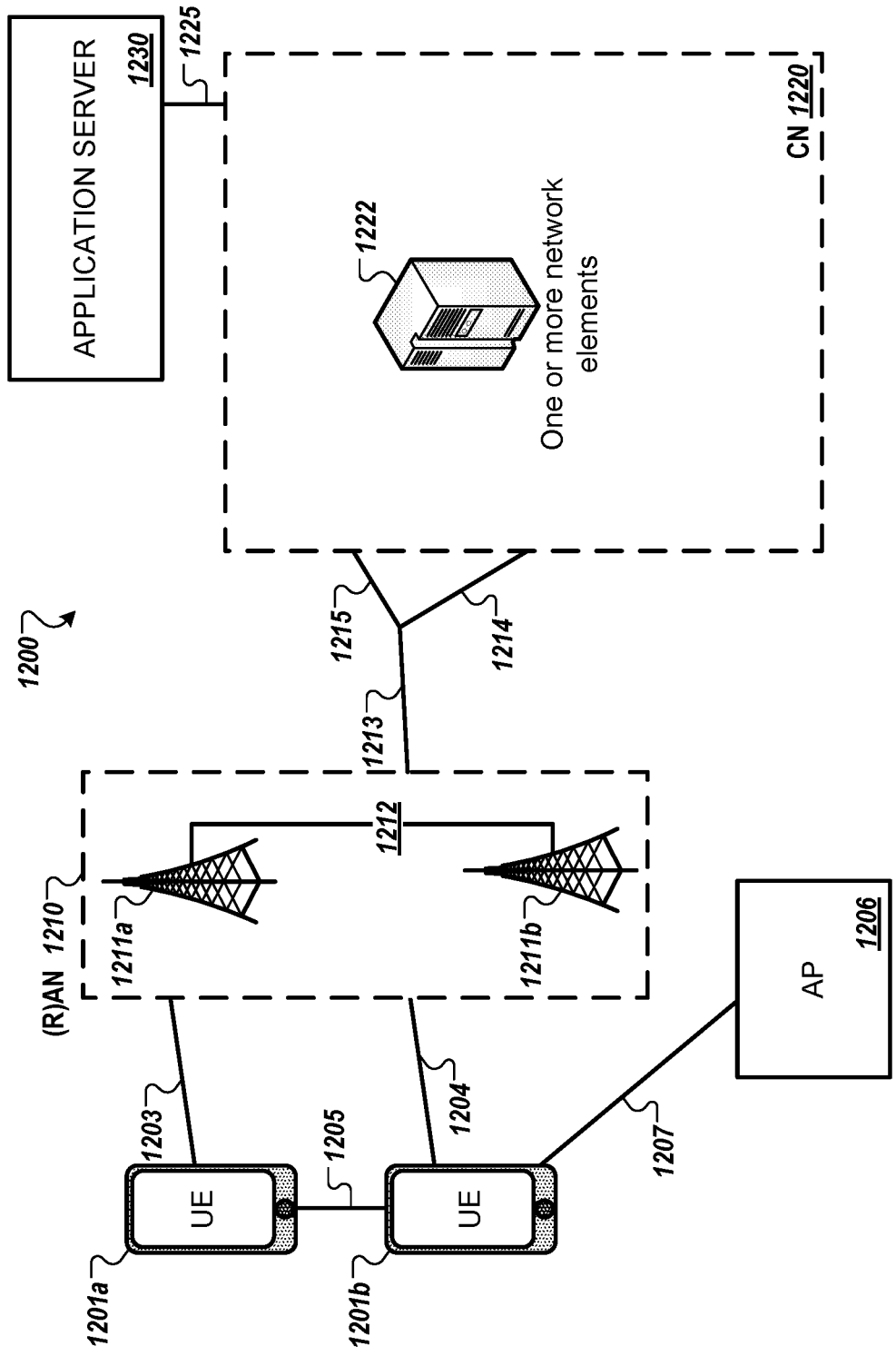
FIG. 12 illustrates an example of a wireless communication system.

FIG. 12 illustrates an example of a wireless communication system 1200. For purposes of convenience and without limitation, the example system 1200 is described in the context of Long Term Evolution (LTE) and Fifth Generation (5G) New Radio (NR) communication standards as defined by the Third Generation Partnership Project (3GPP) technical specifications. More specifically, the wireless communication system 1200 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 1200 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 12, the system 1200 includes UE 1201a and UE 1201b (collectively referred to as "UEs 1201" or "UE 1201"). In this example, UEs 1201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 may be configured to connect, for example, communicatively couple, with RAN 1210. In embodiments, the RAN 1210 may be an NG RAN or a 5G RAN, an E-UTRAN, or a legacy RAN, such as a UTRAN or GERAN. As used herein, the term "NG RAN" or the like may refer to a RAN 1210 that operates in an NR or 5G system 1200, and the term "E-UTRAN" or the like may refer to a RAN 1210 that operates in an LTE or 4G system 1200. The UEs 1201 utilize connections (or channels) 1203 and 1204, respectively, each of which comprises a physical communications interface or layer (discussed in further detail below).

In this example, the connections 1203 and 1204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 1201 may directly exchange communication data via a ProSe interface 1205. The ProSe interface 1205 may alternatively be referred to as a SL interface 1205 and may comprise one or more logical channels, including but not limited to a PSCCH, a PSSCH, a PSDCH, and a PSBCH.

The UE 1201b is shown to be configured to access an AP 1206 (also referred to as "WLAN node 1206," "WLAN 1206," "WLAN Termination 1206," "WT 1206" or the like) via connection 1207. The connection 1207 can comprise a local wireless connection, such as a connection consistent with any IEEE 802.11 protocol, wherein the AP 1206 would comprise a wireless fidelity (Wi-Fi®) router. In this example, the AP 1206 is shown to be connected to the Internet without connecting to the core network of the wireless system (described in further detail below). In various embodiments, the UE 1201b, RAN 1210, and AP 1206 may be configured to utilize LWA operation and/or LWIP operation. The LWA operation may involve the UE 1201b in RRC_CONNECTED being configured by a RAN node 1211a-b to utilize radio resources of LTE and WLAN. LWIP operation may involve the UE 1201b using WLAN radio resources (e.g., connection 1207) via IPsec protocol tunneling to authenticate and encrypt packets (e.g., IP packets) sent over the connection 1207. IPsec tunneling may include encapsulating the entirety of original IP packets and adding a new packet header, thereby protecting the original header of the IP packets.

The RAN 1210 can include one or more AN nodes or RAN nodes 1211a and 1211b (collectively referred to as "RAN nodes 1211" or "RAN node 1211") that enable the connections 1203 and 1204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1211 that operates in an NR or 5G system 1200 (for example, a gNB), and the term "E-UTRAN node" or the like may refer to a RAN node 1211 that operates in an LTE or 4G system 1200 (e.g., an eNB). According to various embodiments, the RAN nodes 1211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1211 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1211; a MAC/PHY split wherein RRC, PDCP, RLC, and MAC layers are operated by the CRAN/vBBUP and the PHY layer is operated by individual RAN nodes 1211; or a "lower PHY" split wherein RRC, PDCP, RLC, MAC layers and upper portions of the PHY layer are operated by the CRAN/vBBUP and lower portions of the PHY layer are operated by individual RAN nodes 1211. This virtualized framework allows the freed-up processor cores of the RAN nodes 1211 to perform other virtualized applications. In some implementations, an individual RAN node 1211 may represent individual gNB-DUs that are connected to a gNB-CU via individual F1 interfaces (not shown by FIG. 12). In these implementations, the gNB-DUs may include one or more remote radio heads or RFEMs (see, e.g., FIG. 13), and the gNB-CU may be operated by a server that is located in the RAN 1210 (not shown) or by a server pool in a similar manner as the CRAN/vBBUP. Additionally or alternatively, one or more of the RAN nodes 1211 may be next generation eNBs (ng-eNBs), which are RAN nodes that provide E-UTRA user plane and control plane protocol terminations toward the UEs 1201, and are connected to a 5GC via an NG interface (discussed infra).

In V2X scenarios one or more of the RAN nodes 1211 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1201 (vUEs 1201). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1211 can terminate the air interface protocol and can be the first point of contact for the UEs 1201. In some embodiments, any of the RAN nodes 1211 can fulfill various logical functions for the RAN 1210 including, but not limited to, radio network controller (RNC) functions such as radio bearer management, uplink and downlink dynamic radio resource management and data packet scheduling, and mobility management.

In embodiments, the UEs 1201 can be configured to communicate using OFDM communication signals with each other or with any of the RAN nodes 1211 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 to the UEs 1201, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1201 and the RAN nodes 1211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 1201 and the RAN nodes 1211 may operate using LAA, eLAA, and/or feLAA mechanisms. In these implementations, the UEs 1201 and the RAN nodes 1211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1201 RAN nodes 1211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1201, AP 1206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1201. The PDCCH carries information about the transport format and resource allocations related to the PDSCH channel, among other things. It may also inform the UEs 1201 about the transport format, resource allocation, and HARQ information related to the uplink shared channel. Typically, downlink scheduling (assigning control and shared channel resource blocks to the UE 1201b within a cell) may be performed at any of the RAN nodes 1211 based on channel quality information fed back from any of the UEs 1201. The downlink resource assignment information may be sent on the PDCCH used for (e.g., assigned to) each of the UEs 1201.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1211 may be configured to communicate with one another via interface 1212. In embodiments where the system 1200 is an LTE system 12, the interface 1212 may be an X2 interface 1212. The X2 interface may be defined between two or more RAN nodes 1211 (e.g., two or more eNBs and the like) that connect to EPC 1220, and/or between two eNBs connecting to EPC 1220. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1201 from an SeNB for user data; information of PDCP PDUs that were not delivered to a UE 1201; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1200 is a 5G or NR system 12, the interface 1212 may be an Xn interface 1212. The Xn interface is defined between two or more RAN nodes 1211 (e.g., two or more gNBs and the like) that connect to 5GC 1220, between a RAN node 1211 (e.g., a gNB) connecting to 5GC 1220 and an eNB, and/or between two eNBs connecting to 5GC 1220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1201 in a connected mode (e.g., CM-CONNECTED) including functionality to manage the UE mobility for connected mode between one or more RAN nodes 1211. The mobility support may include context transfer from an old (source) serving RAN node 1211 to new (target) serving RAN node 1211; and control of user plane tunnels between old (source) serving RAN node 1211 to new (target) serving RAN node 1211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1210 is shown to be communicatively coupled to a core network—in this embodiment, core network (CN) 1220. The CN 1220 may comprise a plurality of network elements 1222, which are configured to offer various data and telecommunications services to customers/subscribers (e.g., users of UEs 1201) who are connected to the CN 1220 via the RAN 1210. The components of the CN 1220 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1220 may be referred to as a network slice, and a logical instantiation of a portion of the CN 1220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1230 may be an element offering applications that use IP bearer resources with the core network (e.g., UMTS PS domain, LTE PS data services, etc.). The application server 1230 can also be configured to support one or more communication services (e.g., VoIP sessions, PTT sessions, group communication sessions, social networking services, etc.) for the UEs 1201 via the EPC 1220.

In embodiments, the CN 1220 may be a 5GC (referred to as "5GC 1220" or the like), and the RAN 1210 may be connected with the CN 1220 via an NG interface 1213. In embodiments, the NG interface 1213 may be split into two parts, an NG user plane (NG-U) interface 1214, which carries traffic data between the RAN nodes 1211 and a UPF, and the $S_1$ control plane (NG-C) interface 1215, which is a signaling interface between the RAN nodes 1211 and AMFs. 1212

In embodiments, the CN 1220 may be a 5G CN (referred to as "5GC 1220" or the like), while in other embodiments, the CN 1220 may be an EPC). Where CN 1220 is an EPC (referred to as "EPC 1220" or the like), the RAN 1210 may be connected with the CN 1220 via an S1 interface 1213. In embodiments, the S1 interface 1213 may be split into two parts, an $S_1$ user plane (S1-U) interface 1214, which carries traffic data between the RAN nodes 1211 and the S-GW, and the S1-MME interface 1215, which is a signaling interface between the RAN nodes 1211 and MMEs.

Figure 13:
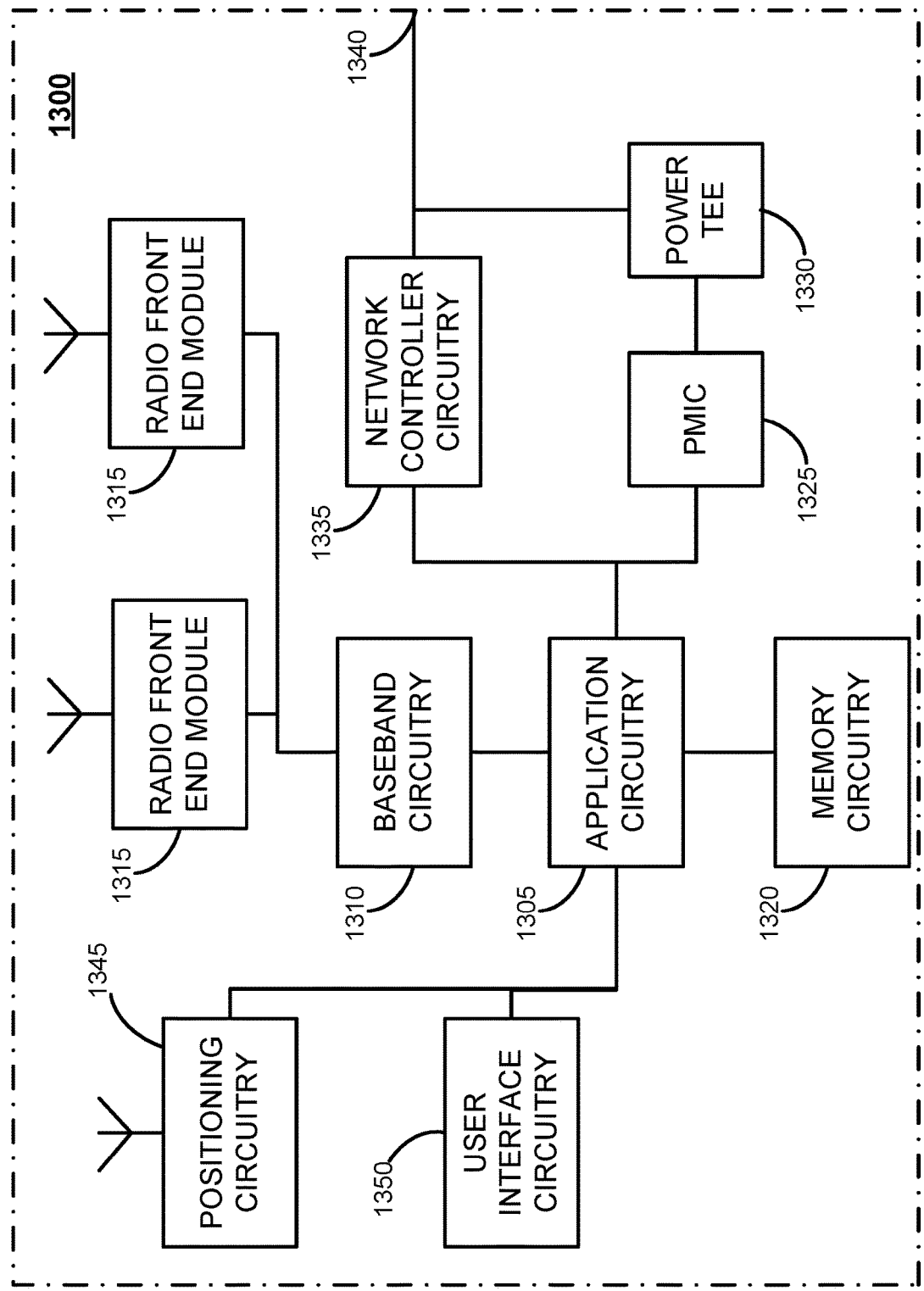
FIG. 13 illustrates an example of infrastructure equipment.

FIG. 13 illustrates an example of infrastructure equipment 1300 in accordance with various embodiments. The infrastructure equipment 1300 (or "system 1300") may be implemented as a base station, radio head, RAN node such as the RAN nodes 1211 and/or AP 1206 shown and described previously, application server(s) 1230, and/or any other element/device discussed herein. In other examples, the system 1300 could be implemented in or by a UE.

The system 1300 includes application circuitry 1305, baseband circuitry 1310, one or more radio front end modules (RFEMS) 1315, memory circuitry 1320, power management integrated circuitry (PMIC) 1325, power tee circuitry 1330, network controller circuitry 1335, network interface connector 1340, satellite positioning circuitry 1345, and user interface circuitry 1350. In some embodiments, the system 1300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1305 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1305 may be coupled with or may include memory/storage elements and may be configured to execute instructions stored in the memory/storage to enable various applications or operating systems to run on the system 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1305 may comprise, or may be, a special-purpose processor/controller to operate according to the various embodiments herein. As examples, the processor(s) of application circuitry 1305 may include one or more may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some embodiments, the system 1300 may not utilize application circuitry 1305, and instead may include a special-purpose processor/controller to process IP data received from an EPC or 5GC, for example.

In some implementations, the application circuitry 1305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1305 may comprise logic blocks or logic fabric, and other interconnected resources that may be programmed to perform various functions, such as the procedures, methods, functions, etc. Of the various embodiments discussed herein. In such embodiments, the circuitry of application circuitry 1305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 1310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1310 are discussed infra with regard to FIG. 15.

User interface circuitry 1350 may include one or more user interfaces designed to enable user interaction with the system 1300 or peripheral component interfaces designed to enable peripheral component interaction with the system 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMS) 1315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1511 of FIG. 15 infra), and the RFEM may be connected to multiple antennas. In alternative implementations, both mmWave and sub-mmWave radio functions may be implemented in the same physical RFEM 1315, which incorporates both mmWave antennas and sub-mmWave.

The memory circuitry 1320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1320 may be implemented as one or more of solder down packaged integrated circuits, socketed memory modules and plug-in memory cards.

The PMIC 1325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1330 may provide for electrical power drawn from a network cable to provide both power supply and data connectivity to the infrastructure equipment 1300 using a single cable.

The network controller circuitry 1335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1300 via network interface connector 1340 using a physical connection, which may be electrical (commonly referred to as a "copper interconnect"), optical, or wireless. The network controller circuitry 1335 may include one or more dedicated processors and/or FPGAs to communicate using one or more of the aforementioned protocols. In some implementations, the network controller circuitry 1335 may include multiple controllers to provide connectivity to other networks using the same or different protocols.

The positioning circuitry 1345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1345 may include a Micro-Technology for Positioning, Navigation, and Timing (Micro-PNT) IC that uses a master timing clock to perform position tracking/estimation without GNSS assistance. The positioning circuitry 1345 may also be part of, or interact with, the baseband circuitry 1310 and/or RFEMs 1315 to communicate with the nodes and components of the positioning network. The positioning circuitry 1345 may also provide position data and/or time data to the application circuitry 1305, which may use the data to synchronize operations with various infrastructure (e.g., RAN nodes 1211, etc.), or the like.

The components shown by FIG. 13 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 14:
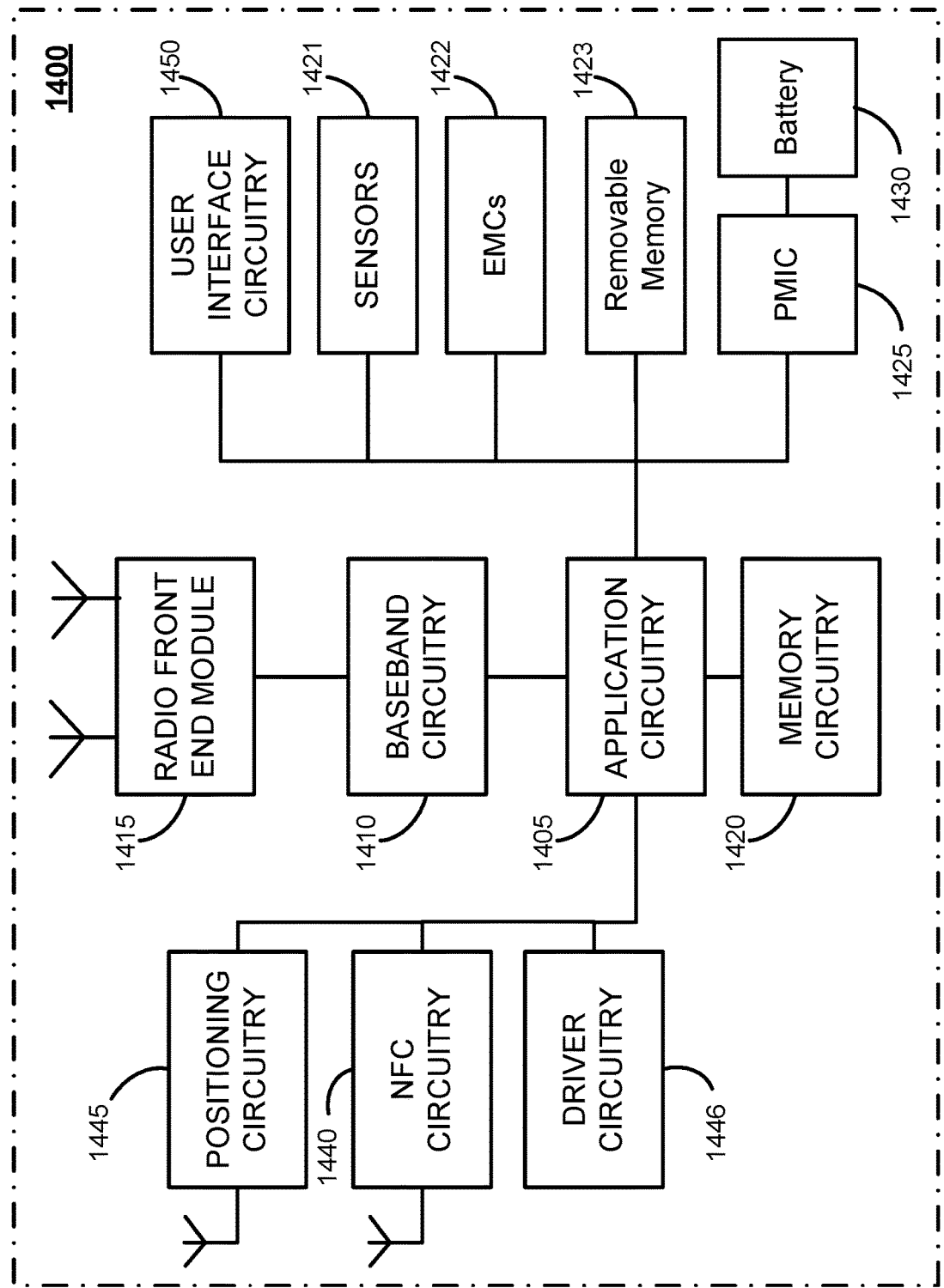
FIG. 14 illustrates an example of a platform.

FIG. 14 illustrates an example of a platform 1400 (or "device 1400") in accordance with various embodiments. In embodiments, the computer platform 1400 may be suitable for use as UEs 1201, application servers 1230, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1405 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1405 may be coupled with or may include memory/storage elements and may be configured to execute instructions stored in the memory/storage to enable various applications or operating systems to run on the platform 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1305 may comprise, or may be, a special-purpose processor/controller to operate according to the various embodiments herein.

As examples, the processor(s) of application circuitry 1405 may include an Apple A-series processor. The processors of the application circuitry 1405 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1405 may be a part of a system on a chip (SoC) in which the application circuitry 1405 and other components are formed into a single integrated circuit.

Additionally or alternatively, application circuitry 1405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1405 may comprise logic blocks or logic fabric, and other interconnected resources that may be programmed to perform various functions, such as the procedures, methods, functions, etc. Of the various embodiments discussed herein. In such embodiments, the circuitry of application circuitry 1405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up tables (LUTs) and the like.

The baseband circuitry 1410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1410 are discussed infra with regard to FIG. 15.

The RFEMs 1415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1511 of FIG. 15 infra), and the RFEM may be connected to multiple antennas. In alternative implementations, both mmWave and sub-mmWave radio functions may be implemented in the same physical RFEM 1415, which incorporates both mmWave antennas and sub-mmWave.

The memory circuitry 1420 may include any number and type of memory devices used to provide for a given amount of system memory. As examples, the memory circuitry 1420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1420 may be developed in accordance with a Joint Electron Devices Engineering Council (JEDEC) low power double data rate (LPDDR)-based design, such as LPDDR2, LPDDR3, LPDDR4, or the like. Memory circuitry 1420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1420 may be on-die memory or registers associated with the application circuitry 1405. To provide for persistent storage of information such as data, applications, operating systems and so forth, memory circuitry 1420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1400 may incorporate the three-dimensional (3D) cross-point (XPOINT) memories from Intel® and Micron®.

Removable memory circuitry 1423 may include devices, circuitry, enclosures/housings, ports or receptacles, etc. Used to couple portable data storage devices with the platform 1400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1400 may also include interface circuitry (not shown) that is used to connect external devices with the platform 1400. The external devices connected to the platform 1400 via the interface circuitry include sensor circuitry 1421 and electro-mechanical components (EMCs) 1422, as well as removable memory devices coupled to removable memory circuitry 1423.

The sensor circuitry 1421 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1422 include devices, modules, or subsystems whose purpose is to enable platform 1400 to change its state, position, and/or orientation, or move or control a mechanism or (sub)system. Additionally, EMCs 1422 may be configured to generate and send messages/signaling to other components of the platform 1400 to indicate a current state of the EMCs 1422. Examples of the EMCs 1422 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1400 is configured to operate one or more EMCs 1422 based on one or more captured events and/or instructions or control signals received from a service provider and/or various clients.

In some implementations, the interface circuitry may connect the platform 1400 with positioning circuitry 1445. The positioning circuitry 1445 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-PNT IC that uses a master timing clock to perform position tracking/estimation without GNSS assistance. The positioning circuitry 1445 may also be part of, or interact with, the baseband circuitry 1310 and/or RFEMs 1415 to communicate with the nodes and components of the positioning network. The positioning circuitry 1445 may also provide position data and/or time data to the application circuitry 1405, which may use the data to synchronize operations with various infrastructure (e.g., radio base stations), for turn-by-turn navigation applications, or the like In some implementations, the interface circuitry may connect the platform 1400 with Near-Field Communication (NFC) circuitry 1440. NFC circuitry 1440 is configured to provide contactless, short-range communications based on radio frequency identification (RFID) standards, wherein magnetic field induction is used to enable communication between NFC circuitry 1440 and NFC-enabled devices external to the platform 1400 (e.g., an "NFC touchpoint"). NFC circuitry 1440 comprises an NFC controller coupled with an antenna element and a processor coupled with the NFC controller. The NFC controller may be a chip/IC providing NFC functionalities to the NFC circuitry 1440 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1440, or initiate data transfer between the NFC circuitry 1440 and another active NFC device (e.g., a smartphone or an NFC-enabled POS terminal) that is proximate to the platform 1400.

The driver circuitry 1446 may include software and hardware elements that operate to control particular devices that are embedded in the platform 1400, attached to the platform 1400, or otherwise communicatively coupled with the platform 1400. The driver circuitry 1446 may include individual drivers allowing other components of the platform 1400 to interact with or control various input/output (I/O) devices that may be present within, or connected to, the platform 1400. For example, driver circuitry 1446 may include a display driver to control and allow access to a display device, a touchscreen driver to control and allow access to a touchscreen interface of the platform 1400, sensor drivers to obtain sensor readings of sensor circuitry 1421 and control and allow access to sensor circuitry 1421, EMC drivers to obtain actuator positions of the EMCs 1422 and/or control and allow access to the EMCs 1422, a camera driver to control and allow access to an embedded image capture device, audio drivers to control and allow access to one or more audio devices.

The power management integrated circuitry (PMIC) 1425 (also referred to as "power management circuitry 1425") may manage power provided to various components of the platform 1400. In particular, with respect to the baseband circuitry 1410, the PMIC 1425 may control power-source selection, voltage scaling, battery charging, or DC-to-DC conversion. The PMIC 1425 may often be included when the platform 1400 is capable of being powered by a battery 1430, for example, when the device is included in a UE 1201.

In some embodiments, the PMIC 1425 may control, or otherwise be part of, various power saving mechanisms of the platform 1400. For example, if the platform 1400 is in an RRC_Connected state, where it is still connected to the RAN node as it expects to receive traffic shortly, then it may enter a state known as Discontinuous Reception Mode (DRX) after a period of inactivity. During this state, the platform 1400 may power down for brief intervals of time and thus save power. If there is no data traffic activity for an extended period of time, then the platform 1400 may transition off to an RRC_Idle state, where it disconnects from the network and does not perform operations such as channel quality feedback, handover, etc. The platform 1400 goes into a very low power state and it performs paging where again it periodically wakes up to listen to the network and then powers down again. The platform 1400 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1430 may power the platform 1400, although in some examples the platform 1400 may be mounted deployed in a fixed location, and may have a power supply coupled to an electrical grid. The battery 1430 may be a lithium ion battery, a metal-air battery, such as a zinc-air battery, an aluminum-air battery, a lithium-air battery, and the like. In some implementations, such as in V2X applications, the battery 1430 may be a typical lead-acid automotive battery.

In some implementations, the battery 1430 may be a "smart battery," which includes or is coupled with a Battery Management System (BMS) or battery monitoring integrated circuitry. The BMS may be included in the platform 1400 to track the state of charge (SoCh) of the battery 1430. The BMS may be used to monitor other parameters of the battery 1430 to provide failure predictions, such as the state of health (SoH) and the state of function (SoF) of the battery 1430. The BMS may communicate the information of the battery 1430 to the application circuitry 1405 or other components of the platform 1400. The BMS may also include an analog-to-digital (ADC) convertor that allows the application circuitry 1405 to directly monitor the voltage of the battery 1430 or the current flow from the battery 1430. The battery parameters may be used to determine actions that the platform 1400 may perform, such as transmission frequency, network operation, sensing frequency, and the like.

A power block, or other power supply coupled to an electrical grid may be coupled with the BMS to charge the battery 1430. In some examples, the power block XS30 may be replaced with a wireless power receiver to obtain the power wirelessly, for example, through a loop antenna in the computer platform 1400. In these examples, a wireless battery charging circuit may be included in the BMS. The specific charging circuits chosen may depend on the size of the battery 1430, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1450 includes various input/output (I/O) devices present within, or connected to, the platform 1400, and includes one or more user interfaces designed to enable user interaction with the platform 1400 and/or peripheral component interfaces designed to enable peripheral component interaction with the platform 1400. The user interface circuitry 1450 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1400. The output device circuitry may also include speakers or other audio emitting devices, printer(s), and/or the like. In some embodiments, the sensor circuitry 1421 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1400 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 15:
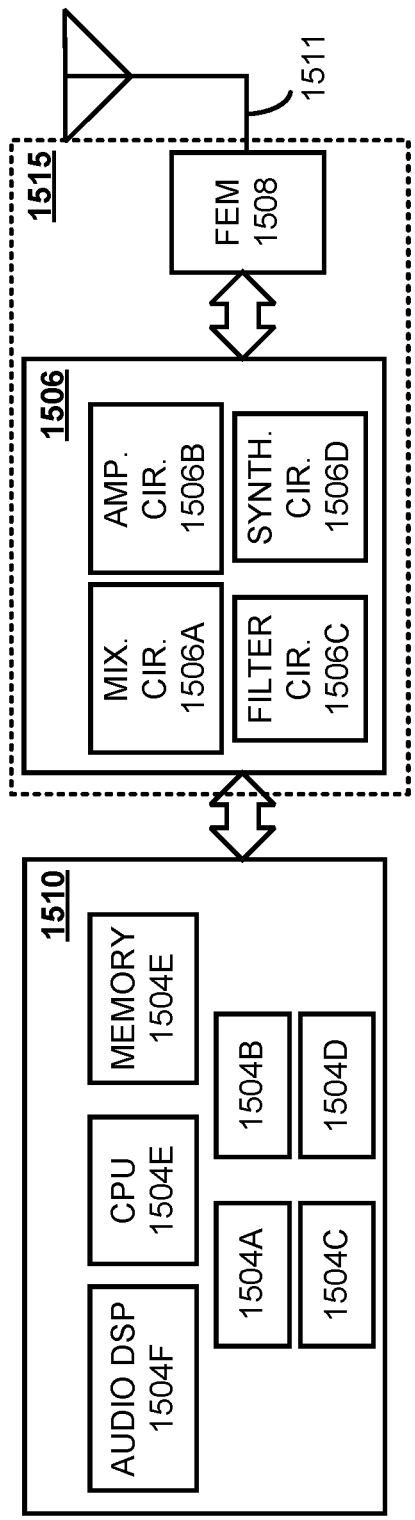
FIG. 15 illustrates example components of baseband circuitry and radio front end modules ("RFEM").

FIG. 15 illustrates example components of baseband circuitry 1510 and radio front end modules (RFEM) 1515 in accordance with various embodiments. The baseband circuitry 1510 corresponds to the baseband circuitry 1310 and 1410 of FIGS. 13 and 14, respectively. The RFEM 1515 corresponds to the RFEM 1315 and 1415 of FIGS. 13 and 14, respectively. As shown, the RFEMs 1515 may include Radio Frequency (RF) circuitry 1506, front-end module (FEM) circuitry 1508, antenna array 1511 coupled together at least as shown.

The baseband circuitry 1510 includes circuitry and/or control logic configured to carry out various radio/network protocol and radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1510 may include Fast-Fourier Transform (FFT), precoding, or constellation mapping/demapping functionality. In some embodiments, encoding/decoding circuitry of the baseband circuitry 1510 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1510 is configured to process baseband signals received from a receive signal path of the RF circuitry 1506 and to generate baseband signals for a transmit signal path of the RF circuitry 1506. The baseband circuitry 1510 is configured to interface with application circuitry 1305/1405 (see FIGS. 13 and 14) for generation and processing of the baseband signals and for controlling operations of the RF circuitry 1506. The baseband circuitry 1510 may handle various radio control functions.

The aforementioned circuitry and/or control logic of the baseband circuitry 1510 may include one or more single or multi-core processors. For example, the one or more processors may include a 3G baseband processor 1504A, a 4G/LTE baseband processor 1504B, a 5G/NR baseband processor 1504C, or some other baseband processor(s) 1504D for other existing generations, generations in development or to be developed in the future (e.g., sixth generation (6G), etc.). In other embodiments, some or all of the functionality of baseband processors 1504A-D may be included in modules stored in the memory 1504G and executed via a Central Processing Unit (CPU) 1504E. In other embodiments, some or all of the functionality of baseband processors 1504A-D may be provided as hardware accelerators (e.g., FPGAs, ASICs, etc.) loaded with the appropriate bit streams or logic blocks stored in respective memory cells. In various embodiments, the memory 1504G may store program code of a real-time OS (RTOS), which when executed by the CPU 1504E (or other baseband processor), is to cause the CPU 1504E (or other baseband processor) to manage resources of the baseband circuitry 1510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1510 includes one or more audio digital signal processor(s) (DSP) 1504F. The audio DSP(s) 1504F include elements for compression/decompression and echo cancellation and may include other suitable processing elements in other embodiments.

In some embodiments, each of the processors 1504A-1504E include respective memory interfaces to send/receive data to/from the memory 1504G. The baseband circuitry 1510 may further include one or more interfaces to communicatively couple to other circuitries/devices, such as an interface to send/receive data to/from memory external to the baseband circuitry 1510; an application circuitry interface to send/receive data to/from the application circuitry 1305/1405 of FIGS. 13-XT); an RF circuitry interface to send/receive data to/from RF circuitry 1506 of FIG. 15; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1425.

In alternate embodiments (which may be combined with the above described embodiments), baseband circuitry 1510 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1510 may include protocol processing circuitry with one or more instances of control circuitry (not shown) to provide control functions for the digital baseband circuitry and/or radio frequency circuitry (e.g., the radio front end modules 1515).

Although not shown by FIG. 15, in some embodiments, the baseband circuitry 1510 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1510 and/or RF circuitry 1506 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1510 and/or RF circuitry 1506 are part of a Wi-Fi communication system. In the second example, the protocol processing circuitry would operate Wi-Fi MAC and logical link control (LLC) functions. The protocol processing circuitry may include one or more memory structures (e.g., 1504G) to store program code and data for operating the protocol functions, as well as one or more processing cores to execute the program code and perform various operations using the data. The baseband circuitry 1510 may also support radio communications for more than one wireless protocol.

The various hardware elements of the baseband circuitry 1510 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1510 may be suitably combined in a single chip or chipset, or disposed on a same circuit board. In another example, some or all of the constituent components of the baseband circuitry 1510 and RF circuitry 1506 may be implemented together such as, for example, a system on a chip (SoC) or System-in-Package (SiP). In another example, some or all of the constituent components of the baseband circuitry 1510 may be implemented as a separate SoC that is communicatively coupled with and RF circuitry 1506 (or multiple instances of RF circuitry 1506). In yet another example, some or all of the constituent components of the baseband circuitry 1510 and the application circuitry 1305/1405 may be implemented together as individual SoCs mounted to a same circuit board (e.g., a "multi-chip package").

In some embodiments, the baseband circuitry 1510 may provide for communication compatible with one or more radio technologies. For example, in some embodiments, the baseband circuitry 1510 may support communication with an E-UTRAN or other WMAN, a WLAN, a WPAN. Embodiments in which the baseband circuitry 1510 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. To facilitate the communication with the wireless network. RF circuitry 1506 may include a receive signal path, which may include circuitry to down-convert RF signals received from the FEM circuitry 1508 and provide baseband signals to the baseband circuitry 1510. RF circuitry 1506 may also include a transmit signal path, which may include circuitry to up-convert baseband signals provided by the baseband circuitry 1510 and provide RF output signals to the FEM circuitry 1508 for transmission.

In some embodiments, the receive signal path of the RF circuitry 1506 may include mixer circuitry 1506a, amplifier circuitry 1506b and filter circuitry 1506c. In some embodiments, the transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1510 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1510 and may be filtered by filter circuitry 1506c.

In some embodiments, the mixer circuitry 1506a of the receive signal path and the mixer circuitry 1506a of the transmit signal path may include two or more mixers and may be arranged for quadrature downconversion and upconversion, respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a of the transmit signal path may be arranged for direct downconversion and direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1510 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1510 or the application circuitry 1305/1405 depending on the desired output frequency. In some embodiments, a divider control input (e.g., N) may be determined from a look-up table based on a channel indicated by the application circuitry 1305/1405.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path, which may include circuitry configured to operate on RF signals received from antenna array 1511, amplify the received signals and provide the amplified versions of the received signals to the RF circuitry 1506 for further processing. FEM circuitry 1508 may also include a transmit signal path, which may include circuitry configured to amplify signals for transmission provided by the RF circuitry 1506 for transmission by one or more of antenna elements of antenna array 1511. In various embodiments, the amplification through the transmit or receive signal paths may be done solely in the RF circuitry 1506, solely in the FEM circuitry 1508, or in both the RF circuitry 1506 and the FEM circuitry 1508.

In some embodiments, the FEM circuitry 1508 may include a TX/RX switch to switch between transmit mode and receive mode operation. The FEM circuitry 1508 may include a receive signal path and a transmit signal path. The receive signal path of the FEM circuitry 1508 may include an LNA to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission by one or more antenna elements of the antenna array 1511.

The antenna array 1511 comprises one or more antenna elements, each of which is configured convert electrical signals into radio waves to travel through the air and to convert received radio waves into electrical signals. For example, digital baseband signals provided by the baseband circuitry 1510 is converted into analog RF signals (e.g., modulated waveform) that will be amplified and transmitted via the antenna elements of the antenna array 1511 including one or more antenna elements (not shown). The antenna elements may be omnidirectional, direction, or a combination thereof. The antenna elements may be formed in a multitude of arranges as are known and/or discussed herein. The antenna array 1511 may comprise microstrip antennas or printed antennas that are fabricated on the surface of one or more printed circuit boards. The antenna array 1511 may be formed in as a patch of metal foil (e.g., a patch antenna) in a variety of shapes, and may be coupled with the RF circuitry 1506 and/or FEM circuitry 1508 using metal transmission lines or the like.

Processors of the application circuitry 1305/1405 and processors of the baseband circuitry 1510 may be used to execute elements of one or more instances of a protocol stack. For example, processors of the baseband circuitry 1510, alone or in combination, may be used execute Layer 3, Layer 2, or Layer 1 functionality, while processors of the application circuitry 1305/1405 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

The invention claimed is:

1. A method comprising:
identifying, by a first device and for a first link with a second device, a switch in a first bandwidth part to a second bandwidth part for the first link, the first link associated with a second link having a third bandwidth part, the identifying comprising identifying the switch from a first division duplex type to a second division duplex type;
based at least on identifying the switch from the first division duplex type to the second division duplex type, determining, by the first device, whether a bandwidth band between the second bandwidth part and the third bandwidth part satisfies a threshold guard band; and
determining to maintain the third bandwidth part for the second link in response to determining that the bandwidth band between the second bandwidth part and the third bandwidth part satisfies the threshold guard band.

2. The method of claim 1, wherein determining that the bandwidth band between the second bandwidth part and the third bandwidth part satisfies the threshold guard band comprises determining that the bandwidth band between the second bandwidth part and the third bandwidth part is greater than, equal to, or greater than or equal to the threshold guard band.

3. The method of claim 1, comprising:
determining, by the first device, that a second bandwidth band between a fourth bandwidth part and a fifth bandwidth part does not satisfy the threshold guard band; and
determining to switch the fifth bandwidth part to a sixth bandwidth part for a third link with another device in response to determining that the second bandwidth band between the fourth bandwidth part and the fifth bandwidth part does not satisfy the threshold guard band.

4. The method of claim 3, wherein determining that the bandwidth band between the fourth bandwidth part and the fifth bandwidth part does not satisfy the threshold guard band comprises determining that the bandwidth band between the fourth bandwidth part and the fifth bandwidth part is less than, equal to, or less than or equal to the threshold guard band.

5. The method of claim 1, wherein identifying the switch uses a bandwidth part mapping that indicates which bandwidth parts are associated.

6. The method of claim 1, wherein identifying the switch from the first division duplex type to the second division duplex type comprises identifying the switch from time-division duplex to frequency-division duplex.

7. The method of claim 1, wherein identifying the switch from the first division duplex type to the second division duplex type comprises identifying the switch from frequency-division duplex to time-division duplex.

8. The method of claim 1, wherein the first device comprises a next generation node B and the second device comprises a user equipment.

9. The method of claim 1, wherein the first link comprises a downlink and the second link comprises an uplink.

10. The method of claim 1, wherein the first link comprises an uplink and the second link comprises a downlink.

11. A non-transitory computer storage medium encoded with instructions that, when executed by one or more baseband processors, cause the one or more baseband processors to perform operations comprising:
    identifying, for a first link between a first device that includes the one or more baseband processors and a second device, a switch in a first bandwidth part to a second bandwidth part for the first link, the first link associated with a second link having a third bandwidth part, the identifying comprising identifying the switch from a first division duplex type to a second division duplex type;
    based at least on identifying the switch from the first division duplex type to the second division duplex type, determining whether a bandwidth band between the second bandwidth part and the third bandwidth part satisfies a threshold guard band; and
    determining to maintain the third bandwidth part for the second link in response to determining that the bandwidth band between the second bandwidth part and the third bandwidth part satisfies the threshold guard band.

12. An apparatus comprising one or more baseband processors configured to perform operations comprising:
    identifying, for a first link between a first device that includes the one or more baseband processors and a second device, a switch in a first bandwidth part to a second bandwidth part for the first link, the first link associated with a second link having a third bandwidth part, the identifying comprising identifying the switch from a first division duplex type to a second division duplex type;
    based at least on identifying the switch from the first division duplex type to the second division duplex type, determining whether a bandwidth band between the second bandwidth part and the third bandwidth part satisfies a threshold guard band; and
    determining to maintain the third bandwidth part for the second link in response to determining that whether the bandwidth band between the second bandwidth part and the third bandwidth part satisfies the threshold guard band.

13. The apparatus of claim 12, wherein determining that the bandwidth band between the second bandwidth part and the third bandwidth part satisfies the threshold guard band comprises determining that the bandwidth band between the second bandwidth part and the third bandwidth part is greater than, equal to, or greater than or equal to the threshold guard band.

14. The apparatus of claim 12, the operations comprising:
    determining, by the first device, that a second bandwidth band between a fourth bandwidth part and a fifth bandwidth part does not satisfy the threshold guard band; and
    determining to switch the fifth bandwidth part to a sixth bandwidth part for a third link with another device in response to determining that the second bandwidth band between the fourth bandwidth part and the fifth bandwidth part does not satisfy the threshold guard band.

15. The apparatus of claim 14, wherein determining that the bandwidth band between the fourth bandwidth part and the fifth bandwidth part does not satisfy the threshold guard band comprises determining that the bandwidth band between the fourth bandwidth part and the fifth bandwidth part is less than, equal to, or less than or equal to the threshold guard band.

16. The apparatus of claim 12, wherein identifying the switch from the first division duplex type to the second division duplex type comprises identifying the switch from time-division duplex to frequency-division duplex.

17. The apparatus of claim 12, wherein identifying the switch from the first division duplex type to the second division duplex type comprises identifying the switch from frequency-division duplex to time-division duplex.

* * * * *